United States Patent
Hansen

(10) Patent No.: US 10,990,675 B2
(45) Date of Patent: Apr. 27, 2021

(54) METHODS AND SYSTEMS FOR DETECTING A RANSOMWARE ATTACK USING ENTROPY ANALYSIS AND FILE UPDATE PATTERNS

(71) Applicant: Datto, Inc., Norwalk, CT (US)

(72) Inventor: Kurt Hansen, Rungsted Kyst (DK)

(73) Assignee: DATTO, INC., Norwalk, CT (US)

( * ) Notice: Subject to any disclaimer, the term of this patent is extended or adjusted under 35 U.S.C. 154(b) by 100 days.

(21) Appl. No.: 16/431,188

(22) Filed: Jun. 4, 2019

(65) Prior Publication Data

US 2020/0387609 A1 Dec. 10, 2020

(51) Int. Cl.
G06F 21/56 (2013.01)

(52) U.S. Cl.
CPC ...... *G06F 21/565* (2013.01); *G06F 2221/034* (2013.01)

(58) Field of Classification Search
CPC ........ G06F 21/56; G06F 21/565; G06F 21/55; G06F 21/554; G06F 2221/034; G06F 2221/2107
See application file for complete search history.

(56) References Cited

U.S. PATENT DOCUMENTS

| | | | |
|---|---|---|---|
| 9,053,216 B1 | 6/2015 | Coleman et al. | |
| 9,323,638 B2 | 4/2016 | Coleman et al. | |
| 9,734,337 B1 | 8/2017 | Patton | |
| 9,935,973 B2 | 4/2018 | Crofton et al. | |
| 10,121,003 B1 * | 11/2018 | Adams | G06F 21/565 |
| 10,229,269 B1 * | 3/2019 | Patton | G06F 21/602 |
| 10,262,138 B2 | 4/2019 | Boutnaru | |
| 10,867,040 B2 | 12/2020 | Gibbons | |
| 2010/0287383 A1 * | 11/2010 | Conte | G06F 21/78 713/189 |
| 2011/0107043 A1 | 5/2011 | Palagummi | |
| 2013/0326625 A1 | 12/2013 | Anderson | |
| 2015/0254566 A1 | 9/2015 | Chandramouli | |
| 2017/0177452 A1 | 6/2017 | Parab | |
| 2017/0206353 A1 | 7/2017 | Jai et al. | |
| 2017/0223031 A1 * | 8/2017 | Gu | H04L 63/1416 |
| 2018/0024893 A1 | 1/2018 | Sella | |
| 2018/0075234 A1 * | 3/2018 | Boutnaru | G06F 21/554 |

(Continued)

FOREIGN PATENT DOCUMENTS

EP 3038003 A1 * 6/2016 ........... G06F 21/566

OTHER PUBLICATIONS

"Ransomware detection method based on context-aware entropy analysis", Jung et al., Soft Computing May 30, 2018, 10 pages (22:6731-6740).

(Continued)

*Primary Examiner* — Robert B Leung
(74) *Attorney, Agent, or Firm* — Fay Sharpe LLP

(57) ABSTRACT

This disclosure and the exemplary embodiments described herein, provide methods and systems for detecting a ransomware infection in one or more files. According to an exemplary embodiment, a low frequency encryption analysis and a high frequency encryption analysis of a plurality of received files is performed to determine if the one or more of the files are encrypted. If a file is encrypted, a watcher is utilized to monitor file events associated with the files for determining if one or more of the files are infected with ransomware.

27 Claims, 9 Drawing Sheets

(56) References Cited

U.S. PATENT DOCUMENTS

| | | | |
|---|---|---|---|
| 2018/0107824 A1 | 4/2018 | Gibbons et al. | |
| 2018/0115577 A1 | 4/2018 | Shukla et al. | |
| 2018/0288087 A1 | 10/2018 | Hittel et al. | |
| 2018/0307839 A1* | 10/2018 | Bhave | G06F 21/56 |
| 2018/0330088 A1 | 11/2018 | Crofton et al. | |
| 2019/0108340 A1 | 4/2019 | Bedhapudi et al. | |
| 2019/0138727 A1 | 5/2019 | Dontov et al. | |
| 2019/0158512 A1 | 5/2019 | Zhang | |
| 2019/0294507 A1* | 9/2019 | Linnen | G06F 11/1464 |
| 2020/0004962 A1* | 1/2020 | Araujo | G06F 16/18 |
| 2020/0034537 A1* | 1/2020 | Chen | G06F 16/128 |

OTHER PUBLICATIONS

"Ransomware detection and mitigation tool", Jesper B.S. Christensen et al., MS Thesis, Kongens Lyngby 2017, Technical University of Denmark, 185 pages, 2 files.

Using Entropy Analysis to Find Encrypted and Packed Malware; Sparta et al., IEEE Computer Society, 2007, 6 pages.

"CryptoLock (and Drop It): Stopping Ransomware Attacks on User Data", Scaife et al., 2016 IEEE 36th International Conference on Distributed Computing Systems, 10 pages.

http://mathfaculty.fullerton.edu/mathews/n2003/montecarlopimod.html, (Accessed May 28, 2019).

Mathews, John H., Module for Monte Carlo Pi, http://mathfaculty.fullerton.edu/mathews//n2003/MonteCarloPiMod.html, 2003.

Lyda et al., Using Entropy Analysis to Find Encrypted and Packed Malware, Computer Science IEEE Security & Privacy, 2007.

Jung et al., Ransomware Detection Method Based on Context-Aware Entropy Analysis. Soft Computing 22, 6731-6740, 2018.

Christensen et al., Ransomware Detection and Mitigation Tool, Technical University of Denmark, Department of Applied Mathematics and Computer Science, 2017.

Scaife, et al., "CryptoLock (and Drop It): Stopping Ransomware Attacks on User Data," 2016 IEEE 36th International Conference on Distributed Computing Systems (ICDCS), Nara, 2016, pp. 303-312.

DEW Assciates Corporation, NTFS Directories and Files, http://www.dewassoc.com/kbase/windows_nt/htfs_directories_and_files.htm, 2000.

Miller, CS 537 Lecture Notes, Section 26, Windows (NT) File System, Chapter 22, Section 22.5 in Operating Systems Concepts, 2002.

U.S. Appl. No. 16/840,665, filed Apr. 6, 2020.

* cited by examiner

METHODS AND SYSTEMS FOR DETECTING A RANSOMWARE ATTACK USING ENTROPY ANALYSIS AND FILE UPDATE PATTERNS

BACKGROUND

The present innovations generally address methods and systems for detecting infection of computer files with malicious software, and more specifically, for detecting infection of computer files with ransomware.

INCORPORATION BY REFERENCE http://mathfaculty.fullerton.edu/mathews/n2003/monte-carlopimod.html;

U.S. Patent Publication No. 2019/0138727 A1, Published May 9, 2019, by Dumitru Dontov et al., and entitled "RANSOMWARE PROTECTION FOR CLOUD STORAGE SYSTEMS";

U.S. Patent Publication No. 2019/0108340 A1, Published Apr. 11, 2019, by Purna Chandra Sekhar Bedhapudi et al., and entitled "RANSOMWARE DETECTION";

U.S. Patent Publication No. 2018/0288087 A1, Published Oct. 4, 2018, by Sean Hittel et al., and entitled "SIMULATION AND VISUALIZATION OF MALWARE SPREAD IN A CLOUD-BASED COLLABORATION ENVIRONMENT";

U.S. Patent Publication No. 2018/0107824, published Apr. 19, 2018, by Gibbons et al., and entitled "SYSTEMS AND METHODS FOR DETECTING RANSOMWARE INFECTION";

U.S. Patent Publication No. 2018/0075234, published Mar. 15, 2018, by Shlomi Boutnaru, and entitled "TECHNIQUES FOR DETECTING ENCRYPTION";

U.S. Patent Publication No. 2018/0075239, published Mar. 15, 2018 (now U.S. Pat. No. 10,262,138, issued Apr. 16, 2019), by Shlomi Boutnaru, and entitled "TECHNIQUES FOR RANSOMWARE DETECTION AND MITIGATION";

U.S. Patent Publication No. 2018/0115577, published Apr. 26, 2018, by Shukla et al., and entitled "SYSTEM AND METHOD FOR DETECTING AND MITIGATING RANSOMWARE THREATS";

U.S. Patent Publication No. 2017/0206353 A1, Published Jul. 20, 2017, by Benchiao Jai et al., and entitled "METHOD AND SYSTEM FOR PREVENTING MALICIOUS ALTERATION OF DATA IN COMPUTER SYSTEM";

"RANSOMWARE DETECTION METHOD BASED ON CONTEXT-AWARE ENTROPY ANALYSIS," Soft Computing (2018) 22:6731-6740, https://doi.org/10.1007/s00500-018-3257-z;

"USING ENTROPY ANALYSIS TO FIND ENCRYPTED AND PACKED MALWARE", Robert Lyda, James Hamrock, http://citeseerx.ist.psu.edu/viewdoc/download?doi=10.1.1.120.9861&rep=rep1&type=pdf;

"RANSOMWARE DETECTION AND MITIGATION TOOL," Jesper B. S. Christensen, Niels Beuschau, MS Thesis, http://www2.imm.dtu.dk/pubdb/views/edoc_download.php/7039/pdf/imm7039.pdf; and "CRYPTOLOCK (AND DROP IT): STOPPING RANSOMWARE ATTACKS ON USER DATA," Nolen Scaife, Henry Carter, Patrick Traynor, Kevin R. B. Butler, 2016 IEEE 36th International Conference on Distributed Computing Systems, https://ieeexplore.ieee.org/document/7536529, are incorporated herein by reference in their entirety.

BRIEF DESCRIPTION

In one embodiment of this disclosure, described is a processor implemented method for detecting a ransomware infection in a plurality of files received by a device operatively associated with a file synchronization and sharing network, each file including a plurality of sequential bytes of digital information, the method comprising: a) determining a value-count of byte values included in a file section associated with a received file, the value-count including a count of byte value occurrences of the byte values included in the file section; b) performing a low frequency analysis of the file section to determine if the file section is low frequency encrypted, the low frequency analysis including b1) calculating one or both of a low frequency entropy value associated with the file section and a low frequency average value of substantially all byte values associated with the file section, the low frequency entropy value associated with the count of byte value occurrences of the byte values included in the file section, and b2) comparing one or both of the calculated low frequency entropy value to a low frequency entropy threshold value and the calculated low frequency average value of substantially all byte values to a low frequency average value range threshold to determine if the received file is low frequency encrypted; c) performing a high frequency analysis of the file section to determine if the file section is high frequency encrypted, the high frequency analysis including c1) calculating one or both of a high frequency entropy value associated with the file section and a high frequency high-low probability ratio value associated with the file section, the high frequency entropy value associated with a plurality of subsection entropy values where each subsection entropy value is calculated for one of a plurality of consecutive subsections of bytes included in the file section, and the high frequency high-low probability ratio is calculated by dividing a high probability measure of a byte value by a low probability measure of a byte value included in the file section, and c2) comparing one or both of the calculated high frequency entropy value to a high frequency entropy threshold value and the calculated high frequency high-low probability ratio to a high frequency high-low probability threshold to determine if the received file is high frequency encrypted;

d) if the file section is low frequency encrypted and high frequency encrypted, setting an encryption status condition associated with the received file to indicate the received file is encrypted; and e) if the received file encryption status condition indicates the received file is encrypted, utilizing a watcher to monitor file events associated with the plurality of files received by the device associated with the file synchronization and sharing network to determine if one or more of the plurality of files are ransomware infected.

In another embodiment of this disclosure, described is a ransomware detection module operatively associated with a computer device for detecting a ransomware infection in a plurality of files received by the ransomware detection module, each file including a plurality of sequential bytes of digital information, and the ransomware detection module configured to perform a method comprising: a) determining a value-count of byte values included in a file section associated with a received file, the value-count including a count of byte value occurrences of the byte values included in the file section; b) performing a low frequency analysis of the file section to determine if the file section is low frequency encrypted, the low frequency analysis including b1) calculating one or both of a low frequency entropy value associated with the file section and a low frequency average value of substantially all byte values associated with the file section, the low frequency entropy value associated with the count of byte value occurrences of the byte values included in the file section, and b2) comparing one or both of the calculated low frequency entropy value to a low frequency entropy threshold value and the calculated low frequency average value of substantially all byte values to a low frequency average value range threshold to determine if the received file is low frequency encrypted; c) performing a high frequency analysis of the file section to determine if the file section is high frequency encrypted, the high frequency analysis including c1) calculating one or both of a high frequency entropy value associated with the file section and a high frequency high-low probability ratio value associated with the file section, the high frequency entropy value associated with a plurality of subsection entropy values where each subsection entropy value is calculated for one of a plurality of consecutive subsections of bytes included in the file section, and the high frequency high-low probability ratio is calculated by dividing a high probability measure of a byte value by a low probability measure of a byte value included in the file section, and c2) comparing one or both of the calculated high frequency entropy value to a high frequency entropy threshold value and the calculated high frequency high-low probability ratio to a high frequency high-low probability threshold to determine if the received file is high frequency encrypted; d) if the file section is low frequency encrypted and high frequency encrypted, setting an encryption status condition associated with the received file to indicate the received file is encrypted; and e) if the received file encryption status condition indicates the received file is encrypted, utilizing a watcher to monitor file events associated with the plurality of files received by the device associated with the file synchronization and sharing network to determine if one or more of the plurality of files are ransomware infected.

In still another embodiment of this disclosure, described is a file synchronization and sharing computer network for synchronizing and sharing files and detecting a ransomware infection in a plurality of files received by a device operatively associated with the network, each file including a plurality of sequential bytes of digital information and the file synchronization and sharing computer network comprising: a network of a plurality of computer devices operatively associated with a common server network including one or more servers configured to synchronize and share files between the plurality of computer devices; one or more agent modules operatively associated with the network of plurality of computer devices and the common server network, the one or more agent modules and the one or more servers configured to: a) determine a value-count of byte values included in a file section associated with a received file, the value-count including a count of byte value occurrences of the byte values included in the file section; b) perform a low frequency analysis of the file section to determine if the file section is low frequency encrypted, the low frequency analysis including b1) calculating one or both of a low frequency entropy value associated with the file section and a low frequency average value of substantially all byte values associated with the file section, the low frequency entropy value associated with the count of byte value occurrences of the byte values included in the file section, and b2) comparing one or both of the calculated low frequency entropy value to a low frequency entropy threshold value and the calculated low frequency average value of substantially all byte values to a low frequency average value range threshold to determine if the received file is low frequency encrypted; c) perform a high frequency analysis of the file section to determine if the file section is high frequency encrypted, the high frequency analysis including c1) calculating one or both of a high frequency entropy value associated with the file section and a high frequency high-low probability ratio value associated with the file section, the high frequency entropy value associated with a plurality of subsection entropy values where each subsection entropy value is calculated for one of a plurality of consecutive subsections of bytes included in the file section, and the high frequency high-low probability ratio is calculated by dividing a high probability measure of a byte value by a low probability measure of a byte value included in the file section, and c2) comparing one or both of the calculated high frequency entropy value to a high frequency entropy threshold value and the calculated high frequency high-low probability ratio to a high frequency high-low probability threshold to determine if the received file is high frequency encrypted; d) if the file section is low frequency encrypted and high frequency encrypted, set an encryption status condition associated with the received file to indicate the received file is encrypted; and e) if the received file encryption status condition indicates the received file is encrypted, utilize a watcher to monitor file events associated with the plurality of files received by the device associated with the file synchronization and sharing network to determine if one or more of the plurality of files are ransomware infected.

DETAILED DESCRIPTION

Figure 1:
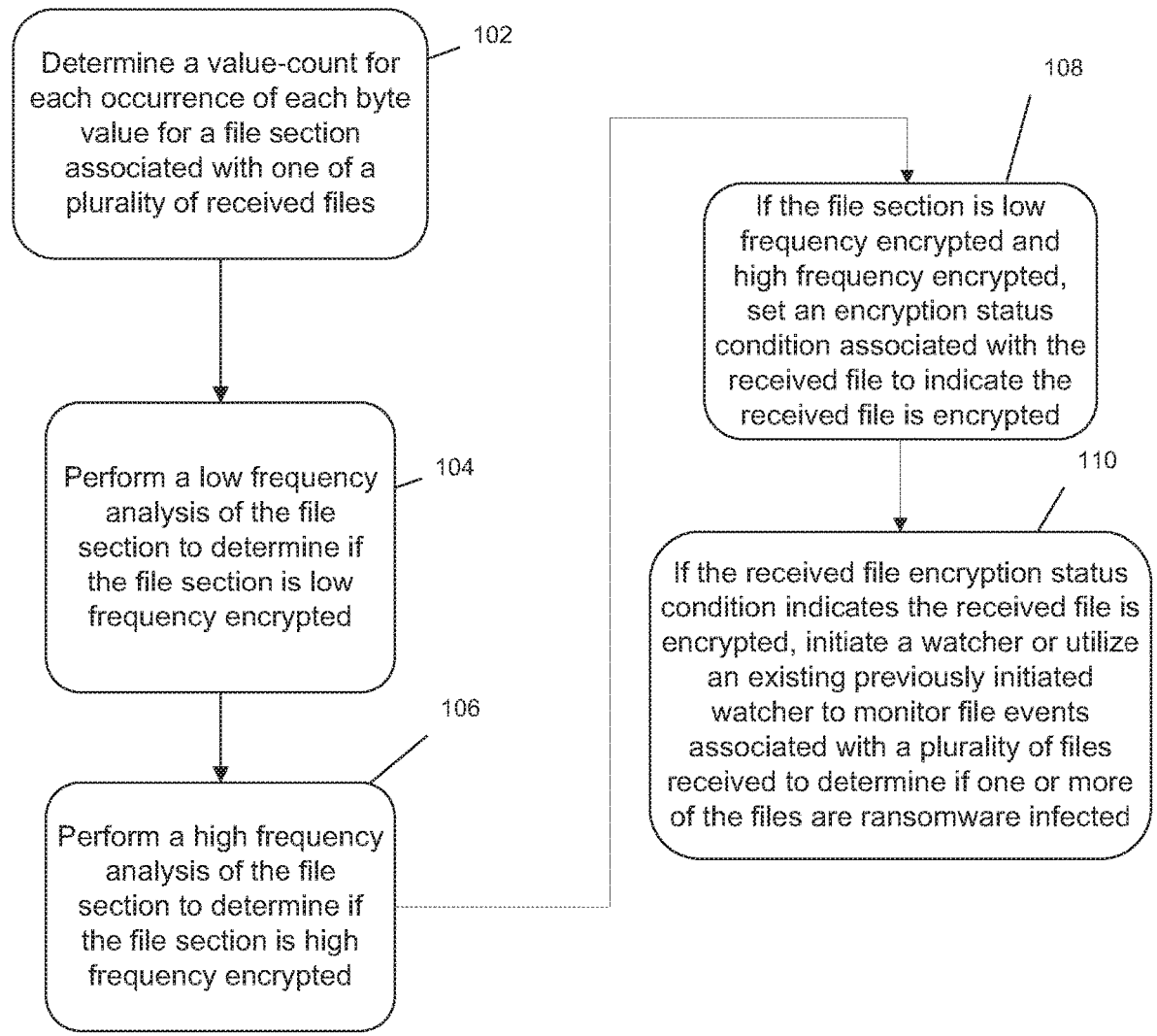
FIG. 1 is a flow chart of a method for detecting a ransomware infection in a plurality of files according to an exemplary embodiment of this disclosure, the method including low frequency encryption analysis and high frequency encryption analysis of a file section to determine an encryption status of the file, and a watcher to monitor file events associated with one or more of the files determined to be low frequency and high frequency encrypted.

The present disclosure provides systems and methods for detecting the presence of ransomware infection within a filesystem. According to an exemplary embodiment, the disclosed systems and methods analyze one or more received files associated a file synchronization and sharing network. In other exemplary embodiments, the disclosed systems and methods analyze a live source volume whose contents are being dynamically changed. The disclosed systems and methods enable a computer user to detect a ransomware infection within a filesystem before the ransomware announces itself by making a ransom demand, and/or before the ransomware has a chance to propagate further. Early detection of ransomware infection is desirable because such detection may enable a user to take actions to mitigate the effects of ransomware. For instance, if the user detects ransomware infection within a filesystem early enough, the user may be able to restore a previous, uninfected backup of the filesystem before the uninfected backup ages out and/or disable an infected device. Similarly, if the user detects ransomware infection before the ransomware has a chance to propagate throughout a filesystem, or from one filesystem to another filesystem, the user may take steps to isolate the infected files and prevent the ransomware from spreading.

Ransomware is a type of computer malware that installs covertly on a victim's computer, disables the user's access to the computer's files, and then demands a ransom payment in order to restore the user's access. Some types of ransomware may covertly encrypt the computer's files with a secret key, and then demand a ransom payment in order to decrypt the files. This ransom demand may be presented to the user via a pop-up message or dialog box that informs the user his or her files have been infected with ransomware, and that the user may only restore access to the files by paying a specified amount of money to a certain online location. Since decrypting the encrypted computer files without the secret key may be difficult, expensive, and/or time-consuming for most users, many users may elect to pay the ransom payment in order to restore access. Notable examples of ransomware include CryptoLocker, Reveton, TorrentLocker, and CryptoWall.

Some computer users attempt to mitigate the consequences of malware infection (including ransomware) by periodically backing up the contents of their filesystems according to a regular schedule. If all or part of a filesystem is corrupted, encrypted, or infected by malware (such as ransomware), a user may restore a previous backup of the filesystem. While the user would lose all changes made to the filesystem since the previous backup, this is generally preferable to losing all or most of the files stored on the filesystem.

However, computers that periodically backup the contents of filesystems generally make space in memory for new backups by deleting older backup versions. For example, computers may delete one or more of the oldest, previously stored backup versions in order to make space for new backup versions. This process of deleting the oldest, previously stored backup versions may be referred to as "aging out" older backup versions. Knowing this, some types of ransomware will not announce its presence in a filesystem (e.g., by demanding the ransom payment) until a certain period of time (e.g., one week) has passed since the initial infection. This waiting period may ensure that all uninfected backup versions of a filesystem will have aged out before the user realizes that his or her files are infected.

Some types of ransomware may also take a significant amount of time to propagate throughout a filesystem. By not announcing its presence in a filesystem for a certain period of time, the ransomware can ensure that all or most of a filesystem is infected before the user becomes aware of the problem. Furthermore, some types of ransomware are programmed to attack outside of normal working hours when employees and/or IT staff are not working, for example weekends or outside normal working hours. This situation can make it difficult and time consuming to determine when an actual attack occurred, and consequently which previous backup to restore a system.

The present disclosure generally provides a design and implementation of a ransomware detection method and system that is an integrated part of a file-sync and share product. A file-sync and share service is especially sensitive to ransomware attacks, because the files being encrypted by the ransomware are quickly disseminated to other users via a cloud server, potentially leaving a company without all its important documents, spreadsheets etc., until a restore from previous versions has been performed and completed. If an attack can be detected quickly, the infected device can be disconnected automatically, and actions can be taken to revert the changes made by this device.

While the ransomware detection exemplary embodiments described herein are of particular importance to a file-sync-share product/service, it is to be understood that the disclosed ransomware detection methods and systems are also applicable to other products/services/systems that include the processing and/or storage of computer related files, e.g. back-up systems, file transfer/storage applications, other computer file utility applications, etc.

The disclosed exemplary ransomware detection methods and systems use several types of analysis to determine whether or not a ransomware attack or infection is occurring.

At a high level, the methods and systems exploit features of ransomware to detect its effects on a filesystem. First, ransomware tends to target only specific file types (e.g., ransomware target file types) within certain filesystem directories (e.g., active user directories) for infection, while leaving other types of files and/or other directories unaffected. Second, since ransomware generally encrypts the files that it infects, and since encryption will increase the randomness of an infected file's contents, a ransomware infection can be detected by measuring the entropy (i.e., randomness or information density) of a file, or a collection of files. As used herein, "entropy" refers to any measure or indication of randomness or information density, and references to the "entropy" of one or more files refers to any measure or indication of the randomness or information density of all or part of the one or more files' contents. Entropy can be measured or indicated using various types of metrics or tests, including, but not limited to, Shannon Entropy, Monte Carlo pi approximations, Chi-Squared tests, or by computing one or more mean byte values. If the measured entropy indicates a high degree of randomness in the contents of the file (or collection of files), this can be an indication that the file(s) have been infected with ransomware. Third, ransomware tends to exhibit other characteristics which are described below.

The disclosed ransomware detection entropy calculations use or omit certain parts of files. High and low entropies for portions of files are calculated and compared to thresholds, and also examined as ratios. The entropy analysis disclosed can be configured to be file size dependent to provide more precise entropy values. A weighted hint in the update analysis is provided by a relatively small database maintained with a subset of known, common filetypes and associated extensions, and an indication of the use of particular file types for a file, as well as whether the file types are known or unknown. A file update pattern is analyzed on a server by means of a "watcher," that monitors file commands arriving from a computing device via its agent module, according to an exemplary embodiment, which communicates with the server. If an update pattern receives a 'score' higher than a certain threshold, an alert is triggered. False-positive detections of encrypted files can be minimized further with the use of an exclusion list that includes known encrypted file types that are not considered a threat.

After a file is determined to be encrypted, the watcher monitors the behavior or characteristics of other files and other file commands, encrypted and unencrypted, to determine if a ransomware attack or infection is potentially occurring. The 'other files' monitored are generally associated in some manner with the file determined to be encrypted and include, but are not limited to: 1) files received by a server from an associated agent module or client device for synchronization, sharing and/or storage, 2) files received or associated with a particular or common time frame or location, 3) files sharing a common processing queue, etc. The 'other file commands' monitored include, but are not limited to, one or more of, copy, replace, delete and move file commands.

The essential characteristics of a ransomware attack (RWA) can be described as including, but not limited to, the following:

a) Files containing user data are the main target (as opposed to system files or files that can easily be restored by reinstalling, etc.);

b) Targeted files are replaced by encrypted files, with a new name and/or extension. Ransomware notes are often added to each folder;

c) The encryption of files happens in rapid succession, or at least in bursts of hundreds of files; and d) A strong encryption algorithm is used.

The components of the RWA detection methods and systems described herein include:

1) A method for detecting if a file is encrypted; and

2) A method for analyzing a file update pattern associated with a plurality of files, in as close to real-time as possible.

It is the combined use of these two methods that generates a strong indicator of a ransomware attack in progress.

Detection of Encrypted Files

Files that have been encrypted by a strong encryption algorithm will exhibit a high 'randomness' of its content. Shannon entropy is a well-known method in information theory for measuring the level of randomness, or disorder of a sequence of values. According to the disclosed encryption detection method, files are analyzed at the byte-level, so the result of computing entropy on the content of a file yields a number between 0 and 8, where 8 indicates the highest level of randomness. Highly compressed files, e.g. zip archives, also exhibit high randomness, but they usually have some level of internal structure rather than being completely random.

An issue associated with computing entropy for a file, and similar methods for measuring randomness, is that existing entropy calculation methods are effectively "low-pass filters." In other words, the larger the files are, the less importance is given to small local areas that contains some kind of structure or relatively nonrandom information. Consequently, ordinary compressed files which are not associated with an RWA will often be computed by existing entropy calculation methods as having a very high entropy; often between 7.98 and 8.00. According to this disclosure and the exemplary embodiments described herein, methods and systems of calculating the entropy and/or randomness are provided which account for the low frequency characteristics and high frequency characteristics of the byte value distributions associated with a file, thereby providing a more intelligent and accurate ransomware detection method which considers small local areas with some kind of internal structure in order to eliminate false-positive detections of a RWA based on a non-threating highly compressed file, e.g. zip archives.

With reference to FIG. 1, shown is a flow chart of a method for detecting a ransomware infection in a plurality of files according to an exemplary embodiment of this disclosure, the method including low frequency encryption analysis and high frequency encryption analysis of a file section to determine an encryption status of the file, and a watcher to monitor file events associated with one or more of the files determined to be low frequency and high frequency encrypted.

At step 102, the method determines a value-count for each occurrence of each byte value for a file section associated with one of a plurality of received files. According to an exemplary embodiment, the value-count includes substantially a total number of byte value occurrences included in the file section for each possible byte value.

At step 104, the method performs a low frequency analysis of the file section to determine if the file section is low frequency encrypted. At step 106, the method performs a high frequency analysis of the file section to determine if the file section is high frequency encrypted.

At step 108, if the file section is low frequency encrypted and high frequency encrypted, the method sets an encryption status condition associated with the received file to indicate the received file is encrypted.

At step 110, if the received file encryption status condition indicates the received file is encrypted, the method initiates or utilizes an existing previously initiated watcher to monitor file events associated with a plurality of files received to determine if one or more of the files are ransomware infected.

The disclosed method for detection of encrypted files includes several algorithms, both with low-pass- and high-pass characteristics, to provide more accurate results.

The suggested parameter values indicated below, are the result of extensive measurements on unencrypted and encrypted files. The encrypted files have been generated from real ransomware infected files, as well as with file encryption software, such as AXCRYPT and BLOWFISH.

Low Frequency Analysis

Figure 2:
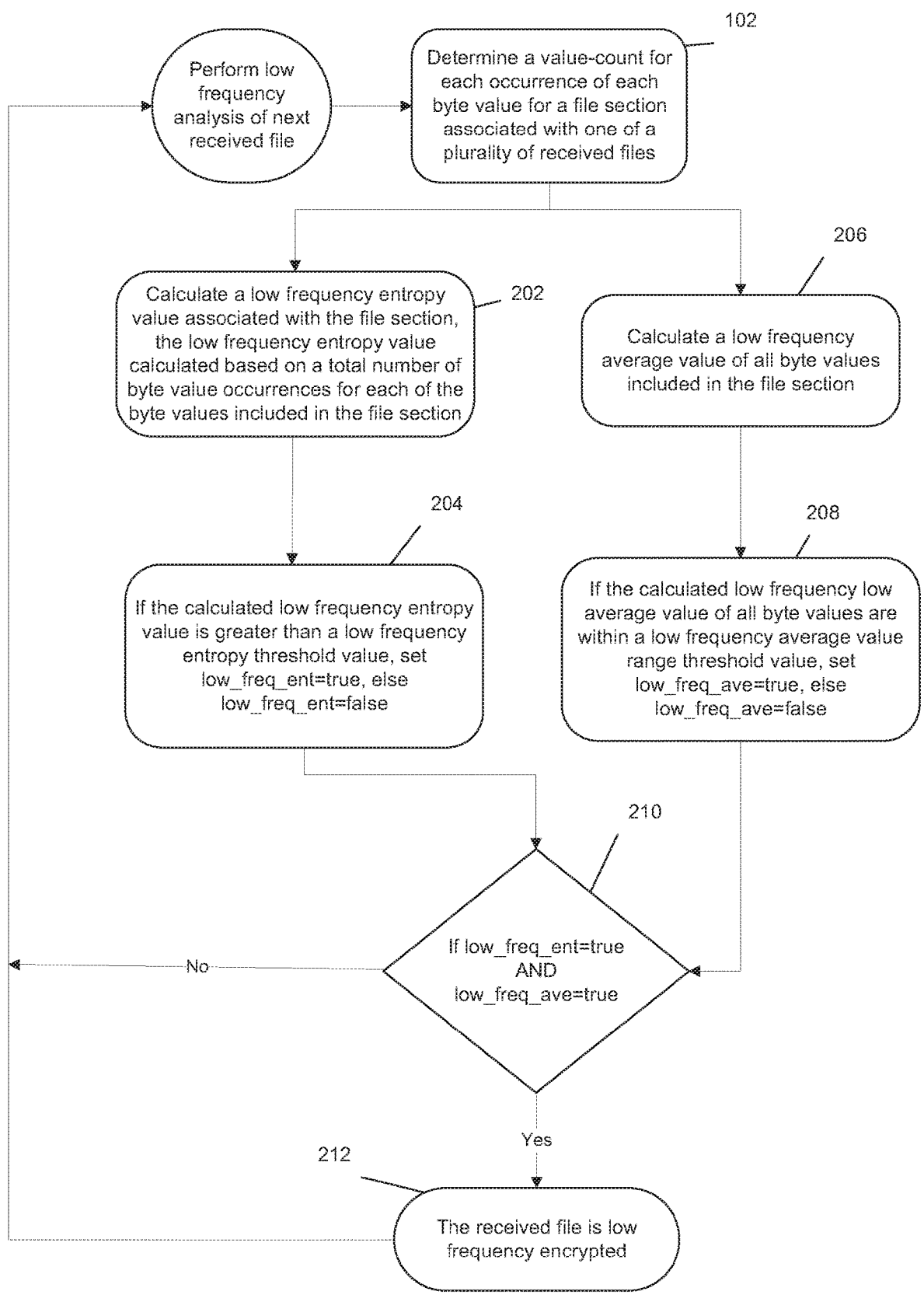
FIG. 2 is a flow chart of a method for performing a low frequency encryption analysis of a file according to an exemplary embodiment of this disclosure.

With reference to FIG. 2, shown is a flow chart of a method for performing a low frequency encryption analysis of a file according to an exemplary embodiment of this disclosure.

At step 102, the method determines substantially a total value-count of each, or substantially each, occurrence of each possible byte value for a file section associated with one of a plurality of received files. According to an exemplary embodiment, the value-count includes substantially a total number of byte value occurrences included in the file section for each possible byte value.

Depending on the characteristics of the file section or other factors, one or more byte values included in the file section may be excluded from the value-count determination. Also, if a possible byte value is not represented/included in the file section, the corresponding byte value counter will be equal to 0 (zero probability) which contributes to the calculations provided below.

At step 202 the method calculates a low frequency entropy value associated with the file section, the low frequency entropy value calculated based on a total number, or substantially a total number, of byte value occurrences included in the file section for each of the possible byte values, where depending on the characteristics of the file section or other factors, one or more byte values included in the file section may be excluded. At step 204 the method determines if the calculated low frequency entropy value is greater than a low frequency entropy threshold value. If the calculated low frequency entropy value is greater than the low frequency entropy threshold value, the method sets low_freq_ent=true, else low_freq_ent=false.

At step 206, the method calculates a low frequency average value of all or substantially all byte values included in the file section, and at step 208 the method determines if the calculated low frequency average value of all, or substantially all, byte values is within a low frequency average value range threshold. If the calculated low frequency low average value of all byte values is within the low frequency average value range threshold value, the method sets low_freq_ave=true, else low_freq_ave=false.

At step 210, if the calculated low frequency entropy value is not greater than the low frequency entropy threshold at step 204, and/or the calculated low frequency average value is not within the low frequency average value range at step 208, the method proceeds back to step 102 and performs a low frequency analysis of the next received file.

If, at step 210, the calculated low frequency entropy value is greater than the low frequency entropy threshold at step 204, and the calculated low frequency average value is within the low frequency average value range at step 208, the method proceeds to step 212 and determines the received file is low frequency encrypted. The method then proceeds back to step 102 and performs a low frequency analysis of the next received file.

According to an exemplary embodiment of the method, 1) the overall entropy for the file calculated, preferably, should be in the range of 7.98-8.0 as an indicator of low frequency encryption; however, a range of 7.92-8.0 can also be used; and 2) the weighted average of all byte-values calculated, preferably should be in a narrow range around 127.5, e.g. 125-130, as an indicator of low frequency encryption.

Figure 3:
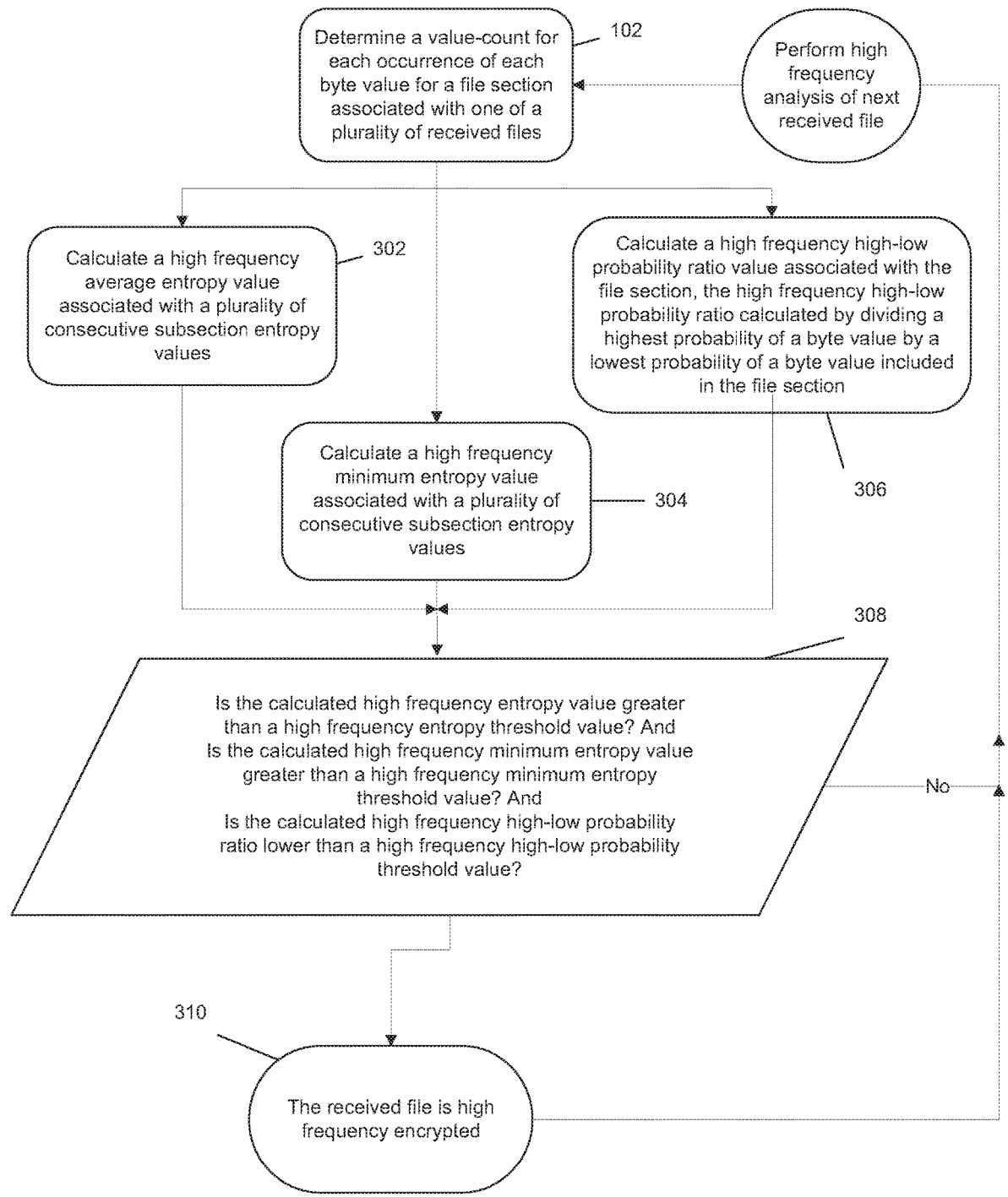
FIG. 3 is a flow chart of a method for performing a high frequency encryption analysis of a file according to an exemplary embodiment of this disclosure.

High Frequency Analysis:

With reference to FIG. 3, shown is a flow chart of a method for performing a high frequency encryption analysis of a file according to an exemplary embodiment of this disclosure.

At step 102, the method the method determines substantially a total value-count of each, or substantially each, occurrence of each possible byte value for a file section associated with one of a plurality of received files. According to an exemplary embodiment, the value-count includes substantially a total number of byte value occurrences included in the file section for each possible byte value.

Depending on the characteristics of the file section or other factors, one or more byte values included in the file section may be excluded from the value-count determination. Also, if a possible byte value is not represented/included in the file section, the corresponding byte value counter will be equal to 0 (zero probability) which contributes to the calculations provided below.

At step 302, the method calculates a high frequency average entropy value associated with a plurality of consecutive subsection entropy values calculated for a plurality of respective consecutive subsections of bytes included in the file section.

At step 304, the method calculates a high frequency minimum entropy value associated with the plurality of consecutive subsection entropy values.

At step 306, the method calculates a high frequency high-low probability ratio value associated with the file section, the high frequency high-low probability ratio calculated by dividing a highest probability of a byte value by a lowest probability of a byte value included in the file section. It is to be understood that the highest probability of a byte value may include any high probability measure, such as but not limited to, one of a plurality of probability indicator values associated with a range of possible probabilities, e.g. very high, high, average, low, very low.

At step 308, the method determines if the calculated high frequency entropy value is greater than a high frequency entropy threshold value, AND the calculated high frequency minimum entropy value greater than a high frequency minimum entropy threshold value, AND the calculated high frequency high-low probability ratio is lower than a high frequency high-low probability threshold value. If No, the method proceeds back to step 102 and performs high frequency analysis of the next received file. If Yes, the method proceeds to step 310.

At step 310, the received file is identified as a high frequency encrypted file and the method proceeds back to step 102 and performs high frequency analysis of the next received file.

According to an exemplary embodiment of the method, 1) the entropy calculated for consecutive sections of bytes, described herein, includes a consecutive section of 256 bytes, however, it is to be understand that other byte section sizes can be used and are within the scope of this disclosure, for example but not limited to, 512 bytes, 1024 bytes, etc. A value of 7.1-7.2 or higher calculated as the average of these entropy-values is a strong indicator of high frequency encryption;

2) if the lowest calculated entropy value is close to 7 or above, it is a good indicator of high frequency encryption. However, a minimum value of 6.25 also produces acceptable results in some applications; and 3) the special indicator referred to as a high-low probability ratio calculated using the highest probability for a byte value divided by the lowest probability (if >0) indicates a perfect distribution if equal to the minimum value of 1, however in practice it is usually not less than 1.2. Preferably, a value in the range from 1 to 2 is a very strong indicator of high frequency encryption. However, a value less than 5 also produces acceptable results in some applications. According to an exemplary embodiment, the high-low probability equals the highest count, or other high count measure, of any byte-value divided by the lowest nonzero count, or other low count measure of any byte value. Alternatively, the high-low probability equals the highest count, or other high count measure, of any byte-value divided by a large number, e.g. 10000, if the actual lowest count of any byte value is zero, substantially zero or some other minimum value/range of values. In practice it is not necessary to read a whole file. If the file is large, an arbitrary max-limit of 256 k can be used, and the first 2 k bytes of the file can be disregarded in case the file contains an unencrypted header. If the file is less than the 256 k limit, the last 1 k of the file is disregarded because some encryption methods include a trailer. Wannacry includes the string WANNACRY! as the first bytes in the file, rather than encrypting from the start. Cerber on the other hand keeps the first couple of hundred bytes from the original file so that a filetype signature, among other things, are not overwritten. COMBO also adds an unencrypted trailer to the file. Because the header and trailer often contain unencrypted data, an encryption detection method would produce skewed calculated values; therefore, they are omitted.

Parameter-ranges for encrypted files can depend on the size of a file, with smaller files requiring a wider range for some of the parameters. According to an exemplary embodiment, files are classified as small, medium or large size files: small files <8 k, medium files <32 k, and large files >32 k. Very small files <2-3 k may be excluded from the encryption analysis because they don't contain enough data after removing the header/trailer.

With reference to the low frequency analysis described above, where the weighted average of all byte-values is calculated, the following parameters based on the file size are used according to an exemplary embodiment:

file size greater than or equal to 8 k: 126-129 average byte value;

file size less than 8 k and greater than or equal to 4 k: 125-130 average byte value; and file size less than 4 k: average byte value not computed.

According to an exemplary embodiment associated with an FSS (File Synchronization and Sharing) network, the encryption status of a received file is computed on a networked device, such as a PC, by an agent module which is configured to communicate with a networked FSS server. The agent module is further configured to send and receive files and detect file update events associated with the device operating system (OS).

An encryption status computation occurs when a new or updated file is about to be sent to the server. Notably, there is not much overhead in doing this because the file has to be moved and read anyway in order to compute md5-checksums, etc. The encryption status, and other parameters, are then sent with the file to the FSS server.

The FSS server maintains a database table for all encryption detection related parameters received from the agent modules. These parameters are used for checking the encryption/entropy status of files that have been deleted, as described in the next method below.

File-signature and file-extension info.

Many common file formats include a small signature of 2 bytes or more in the header and taken together with the file extension identifies the file as being of a certain filetype. When a file is encrypted by ransomware, this relationship is destroyed because the signature may be overwritten, and the file extension is changed to something 'unknown' to the system.

The disclosed ransomware detection methods and systems generate and maintain a relatively small database with a subset of known, common filetypes and associated extensions, and uses of the filetype for a file, known or unknown, as a weighted hint in the update analysis described below.

Also generated and maintained is an excluded list', with certain filetypes that are known to often be calculated as being 'encrypted'. This exclusion list, residing on the server, includes filetypes like 7z, MP4 and files generated by miscellaneous known file encryption programs, like AXCRYPT and BLOWFISH, and some common filetypes like PNG, and PDF files that can be strongly compressed or intentionally encrypted.

Importantly, an exact encryption status prediction is not critical if supplemented with the analysis of an update pattern associated with a group of received files as described below.

Provided below is a code snippet, according to an exemplary embodiment of this disclosure, for an encryption detection method as described herein.

```
/* Constant values used in evaluation */
    static int HeaderSize    = 8 * 256;
    static final float byteavgMin = 127f;
    static final float byteavgMax = 128f;
    static final float entropyMin = 6.5f;
    static final float byteavgMin_Small = 126.5f;
    static final float byteavgMax_Small = 128.5f;
    static final float fractMax = 1.9f;
    static final float piaproxMax = 0.1f;
    static final float fractMaxSmall = 1.9f;
    static final float piAproxMax_Small = 0.1f;
    static final int maxReadSize    = 4* 64 * 1024 ;
    static final int bufferReadSize = 64* 1024;
/* computed values for file */
    float byteavg;              // byte mean value - rounded 2 decimals
    float entropy;              // Entropy           - rounded 2 decimals
    float entropylow;           // Lowest entropy section- rounded 2 decimals
    float entropyavg;           // Average entropy    - rounded 2 decimals
    float hlprop;               // High-Low probably  - rounded 2 decimals
    float piaprox;              // Pi aproximation in % - rounded 3 decimals
    long fileSize ; // Total filesize of file
/*----------------- compute - Is File Encrypted ------------------------------ */
private boolean isEncrypted( )
   {
    if (fileSize < HeaderSize + 255)
       return false;
    if (hlprop > 5 || entropylow < entropyMin)
       return false;
    if (entropyavg >= 7.2 && entropy == 8 && byteavg >= 126.5 && byteavg <= 128.5 )
       return true;
```

```
        if (piaprox < 0.1 && byteavg >= byteavgMin && byteavg <= byteavgMax && hlprop <
            2.0)
            return true;
        if (fileSize < 8 * 1024 + 128)
            return isEncryptedSmall( );
        if (fileSize < 32 * 1024 + 128)
            return isEncryptedMedium(fileSize);
        return isEncryptedLarge(fileSize);
    }
    private Boolean isEncryptedLarge(long fileSize)
    {
        if (entropyavg >= 7.1 && entropylow >= 6.95 && byteavg >= 126 && byteavg <= 129 &&
hlprop < 2)
            return true;
        if (entropyavg >= 7.2 entropylow >= 7 && entropy >= 7.99)
            return true;
        if (piaprox > 1 && fileSize > 100 * 1024)
            return false;
        if (hlprop > 2.0)
            return false;
        if (hlprop < fractMax && piaprox < piaproxMax)
            return true;
        // files > 32k
        if (byteavg >= byteavgMin && byteavg <= byteavgMax)
        {
            if (hlprop < fractMax || piaprox < piaproxMax)
                return true;
            if (byteavg >= 127.4 && byteavg <= 127.6 && (hlprop < 2 || piaprox < 0.6))
                return true;
        }
        else
        {
            if (hlprop < fractMax && piaprox < piaproxMax)
                return true;
        }
        return false;
    }
    private Boolean isEncryptedMedium(long fileSize)
    {
        if (entropyavg >= 7.1 && entropylow >= 6.95 && byteavg >= 126 && byteavg <= 129 &&
hlprop < 4)
            return true;
        if (entropyavg >= 7.2 && entropylow > 7 && (entropy >= 7.99 || fileSize < 16 * 1024))
            return true;
        if (hlprop > 3.0)
            return false;
        // files < 32k
        if (byteavg >= byteavgMin Small && byteavg <= byteavgMax Small)
        {
            if (hlprop <= 2.5 || piaprox < 0.8)
                return true;
            if (byteavg >= 127 && byteavg <= 128 && piaprox < 1)
                return true;
        }
        return false;
    }
    private Boolean isEncryptedSmall( )
    {
        if (entropyavg >= 7.1 && entropylow >= 6.95 && byteavg >= 125 && byteavg <= 130 )
            return true;
        if (byteavg <= 124 || byteavg >= 131 )
            return false;
        if (entropyavg >= 7.2 && entropylow > 7)
            return true;
        if (entropyavg >= 7.1 && entropylow > 7 && entropy > 7.75)
        breturn true;
        // files < 32k
            bif (byteavg >= byteavgMin Small && byteavg <= byteavgMax_Small)
        {
            if (hlprop <= 2.5 || piaprox < 0.8)
                return true;
            if (byteavg >= 127 && byteavg <= 128 && (hlprop < 3 || piaprox < 1))
                return true;
            if (entropylow > 6.95 && hlprop < 3)
                return true;
        }
        return false;
    }
```

Analysis of Update Pattern

An update pattern of one or more received files is analyzed on the server by means of a watcher that monitors file commands arriving from a device, such as a PC, via the device's agent module according to an exemplary embodiment. If an update pattern receives a 'score' higher than a certain threshold, an alert is triggered.

The file commands received by the server mimics the file operations occurring on the agent module, but not necessarily in the same exact order. If a PC device with an online agent is having an RWA, the server will immediately start receiving a high influx of new files and delete-file commands from the agent.

According to an exemplary embodiment, the analysis on the server is performed by the so-called watcher. The watcher is initiated or utilized when a device or agent sends an encrypted file to the server. From this point onwards, file events coming from this particular device or agent are monitored for a period of time. The watcher contains a number of counters, that are maintained and incremented for each incoming file event that match a pattern specific to the counter. Each counter is evaluated against a 'threshold value', and if triggered, the counter contributes to an evaluation result with the weight of this counter. Counters can go 'on' or 'off' as events happen, and as time passes. The evaluation result can be normalized to a value between 0 and 100, and if the evaluation result value is higher than the predefined alert-threshold, a ransomware alert is triggered.

Figure 4:
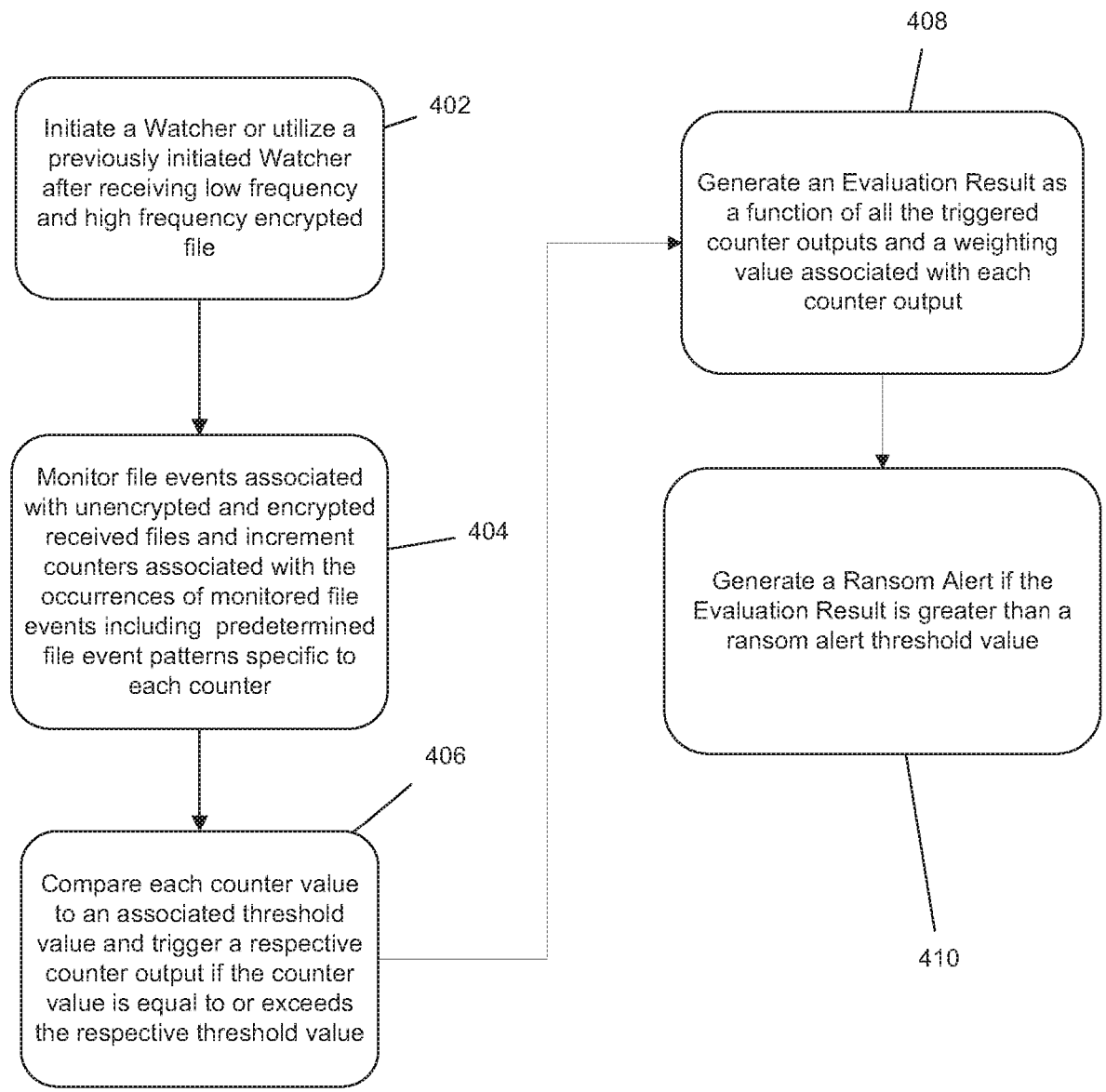
FIG. 4 is a flow chart of a watcher method for monitoring file events associated with one or more files which are encrypted to detect a ransomware infection in one or more of the files according to an exemplary embodiment of this disclosure.

With reference to FIG. 4, shown is a flow chart of a watcher method for monitoring file events associated with one or more files which are encrypted to detect a ransomware infection in one or more of the files according to an exemplary embodiment of this disclosure.

At step 402, the method initiates the watcher or utilizes an existing previously initiated watcher after receiving a low frequency and high frequency encrypted file.

At step 404, the method monitors file events associated with unencrypted and encrypted received files and increments counters associated with the occurrences of monitored file events including predetermined file event patterns specific to each counter.

At step 406, the method compares each counter value to an associated threshold value and triggers a respective counter output if the counter value is equal to or exceeds the respective threshold value.

At step 408, the method generates an Evaluation Result as a function of all the triggered counter outputs and a weighting value associated with each counter output.

At step 410, the method generates a Ransom Alert if the Evaluation Result is greater than a ransom alert threshold value.

Counter threshold values and counter weights are stored in a separate database table and can be configured by a user or administrator. The watcher itself may be closed or go into an idle state when the flow of file commands has stopped for a time period, for example two minutes. The watcher may be checked by supplying 'timer events' to the watcher at regular intervals, to wake it up, in case it is idle. Disconnects of a device or agent may also close the watcher associated with the device or agent module.

Figure 5:
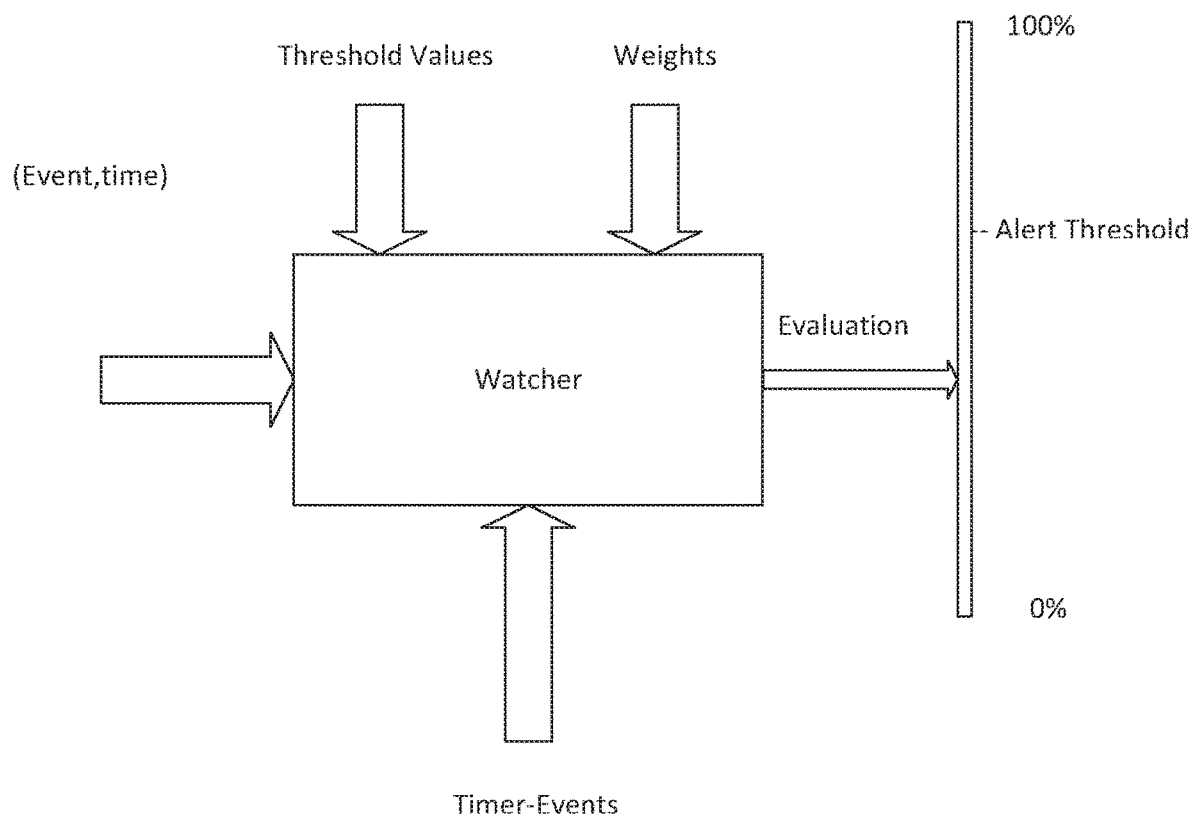
FIG. 5 is a diagram of a watcher initiated by receiving a low frequency and high frequency encrypted file according to an exemplary embodiment of this disclosure.

With reference to FIG. 5, shown is a diagram of a watcher initiated by receiving a low frequency and high frequency encrypted file according to an exemplary embodiment of this disclosure. As shown and described above, the watcher inputs include file-event times, threshold values, counter weights and a time-event trigger. The watcher output includes an evaluation result value which is compared to an alert threshold to generate a ransomware alert.

List of some of the triggers:

As previously described, the evaluation result of the watcher is the sum of the weights of each triggered counter. A counter is triggered if its output value exceeds a specified threshold-value.

According to an exemplary embodiment, some of the triggers required to trigger RWA alert, along with an associated weight are provided in the table below.

| Trigger-events | Counter thresholds | Weight |
| --- | --- | --- |
| manyEncryptedFiles | >10 encrypted files received. Required. An alert is not triggered if only a few encrypted files are received. | +3 |
| largePercentEnrcypted | >75% of all received files in period are encrypted. Required. | +4 |
| lowTimeBetweenUpdates | <10 seconds average between updates. Ransomware can encrypt files with a speed of more than 10 files per second, depending on the file size. They arrive at the server later and later after the encryption, because of the transmission speed, but the creation time of the files (included with the files), reveals the real time between file updates. The average is computed by registering the min, and max. time of the timestamps, in relation to number of files received. | +2 |
| recentTimeStamps | the creation times of the received files is 'recent'. Recent is seen in context of the last time the agent disconnected and connected. If encrypted files are simply being copied or moved around within the synced area, the creation times of the files will be preserved and be 'not recent'. An alert should not happen. | No Weight |
| notSameTimeStamp | the received files do not have the same timestamp | +2 |
| mostWithSameExtension | Most encrypted files have the same extension (>75%) | +3 |
| manyUnknowntypeext | Most encrypted files have an unknown extension | +2 |
| manyOnExclusionList | Most encrypted files have a known filetype, that is on the excluded list (negative weight) | −5 |
| manyDeletedFiles | Many deleted files, count >75% of count of encrypted files | +4 |
| fewEncryptedDeleted | Most of the deleted files are NOT encrypted <25% | +2 |
| manyKnowntypeext | Most of deleted files has known type/extension >75% | +3 |
| samefoldersInsAndDeletes | Most deleted files are in same folders as new files >75%. There are two counters for each folder having received an encrypted file, counting the number of encrypted files, and the number of deletes. If the number matches within a small margin, it is a strong indication of a file being replaced by an encrypted file. File size could also be part of this evaluation. | +2 |

It is to be understood that the trigger examples and their associated weights are only one example of the parameters that can be used for a method and system of detecting ransomware according to this disclosure. Other trigger events and associated counters/counter thresholds can be used depending on the characteristics of a ransomware attack. For the trigger table above, according to an exemplary embodiment, the maximum sum of the weights is 27, which represents a 100% confidence indication of a ransomware attack. According to one implementation, an alert is triggered, as will be described below, if a sum of the active counter weights is equal to or greater than an 80% alert threshold, where the (counter weight sum/maximum sum of the weights)*100% is greater than 80%.

Notably, if many of the encrypted files are on the exclusion list, an alert would not be appropriate. Therefore, this trigger event, "manyOnExclusionList", is associated with a relatively high negative weight as indicated in the table. Also, according one exemplary embodiment, the watcher is terminated or goes idle if no files have been received for more than 3 minutes.

Ransomware Alert

If a ransomware alert is triggered by the watcher counter, it is not always certain the alert was caused by an actual ransomware attack. For example, the alert could be caused by an intentional action by a user. If the user encrypted a portion of his files with some file encryption software (not disk encryption, or similar), it would exhibit the same pattern as an RWA, the only difference being that the user has the key. The specific encryption software being used by the user can be excluded, if known, as described above. However, a final confirmation of the incident by the admin/user is needed in any case.

For purposes of an FSS network, the main objective of a ransomware detection generated ransomware alert is to 1) disable the agent to prevent more infected files from being uploaded and spread and 2) notify an administrator and/or user so action can be taken. The first action to be taken by the administrator/user is to confirm that there is an actual RWA. If confirmed, the files updated by this user can be reverted, where deleted files are undeleted, and uploaded new files are deleted.

Notably, the simple copying of files into a synced area or moving encrypted files around in the synced area will not trigger an alert.

Alert Signature

The value of each trigger (on/off) in an ordered list, constitutes a bit-pattern. This bit pattern, taken together with the extension of the encrypted files, if the same for most files, is a signature for the ransomware alert. According to an exemplary embodiment of this disclosure, the alert signature is used to avoid repeated alerts for the same kind or type of encryption event that generates false positives. In other words, if an admin/user has decided that an alert should be ignored, the system does not generate alerts of the same kind or type, as defined by the alert-signature.

Figure 6:
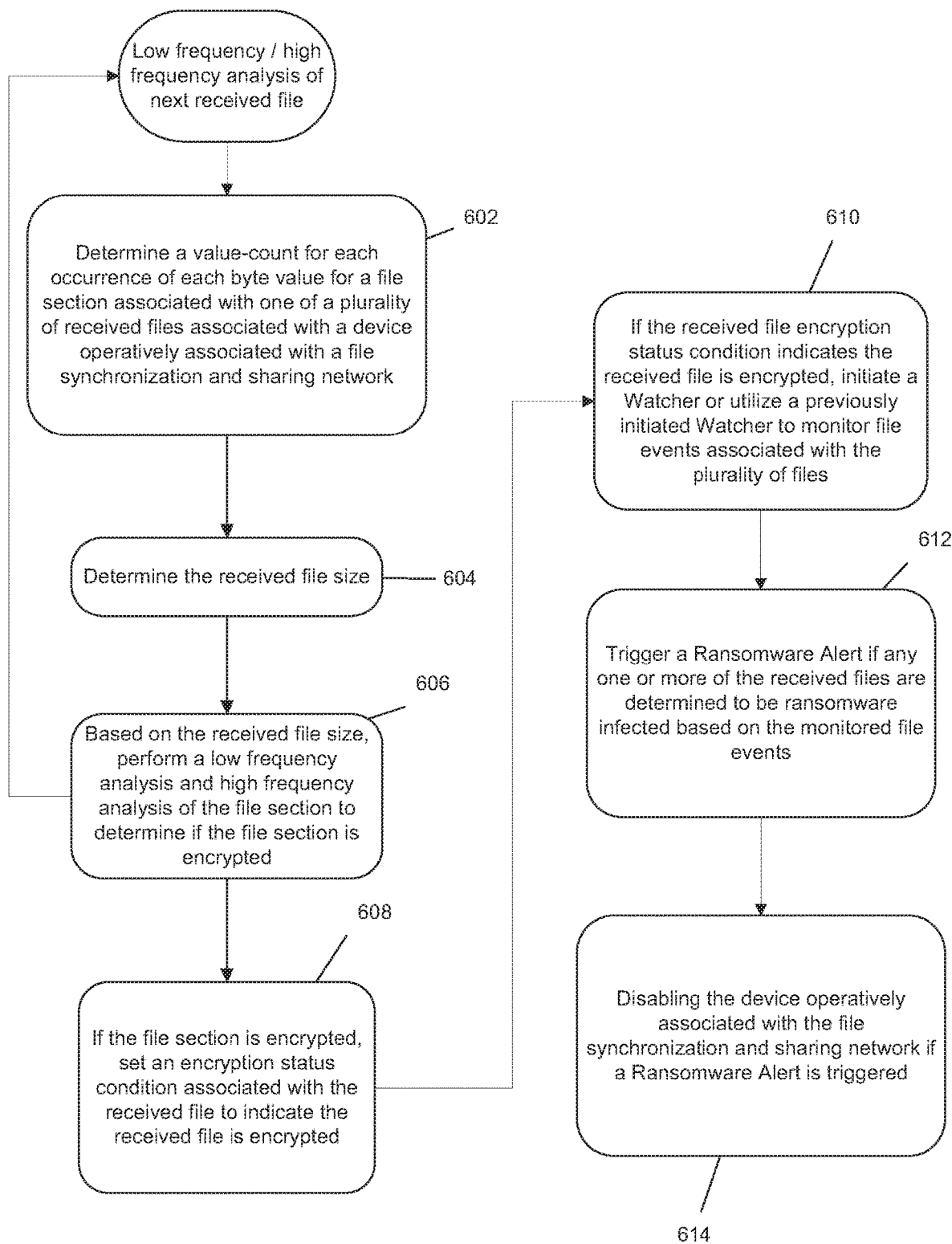
FIG. 6 is a flow chart of a ransomware detection method integrated into a file synchronization and sharing (FSS) network according to an exemplary embodiment of this disclosure.

With reference to FIG. 6, shown is a flow chart of a ransomware detection method integrated into a file synchronization and sharing (FSS) network according to an exemplary embodiment of this disclosure.

At step 602, the method determines a value-count for each occurrence of each byte value for a file section associated with one of a plurality of received files associated with a device operatively associated with a file synchronization and sharing network. According to an exemplary embodiment, the value-count includes substantially a total number of byte value occurrences included in the file section for each possible byte value.

At step 604, the method determines the received file size.

At step 606, based on the received file size, the method performs a low frequency analysis and high frequency analysis of the file section to determine if the file section is encrypted. If the received file is not low frequency encrypted and high frequency encrypted, the method returns to step 602 to perform a low frequency and high frequency analysis of the next received file.

At step 608, if the file section is encrypted, the method sets an encryption status condition associated with the received file to indicate the received file is encrypted.

If the received file encryption status condition indicates the received file is encrypted, at step 610 the method initiates a watcher or an existing previously initiated watcher to monitor file events associated with the plurality of files.

At step 612, the method triggers a Ransomware Alert if any one or more of the received files are determined to be ransomware infected based on the monitored file events.

At step 614, the method disables the device operatively associated with the file synchronization and sharing network if a Ransomware Alert is triggered.

The methods and systems described above, make use of a general expected behavior from ransomware software, but does not, due to the trigger and weighting system, depend on any specific behavior. Future versions of ransomware could have a different behavior than specifically defined herein, that could require different triggers or different weights, which can then be added to the watcher and are within the scope of this disclosure.

Figure 7:
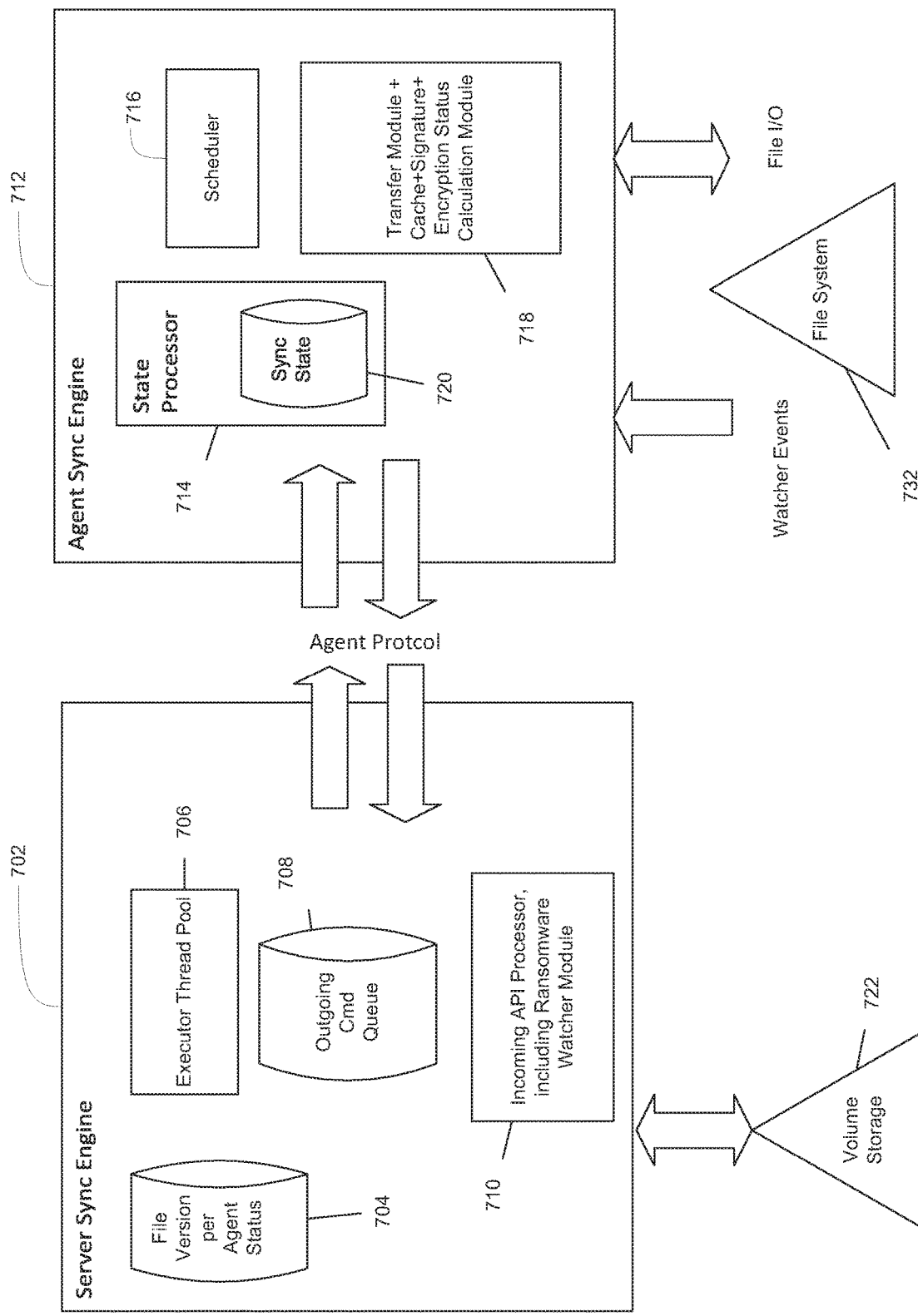
FIG. 7 is a block diagram of an FSS server and agent architecture including a ransomware detection module according to an exemplary embodiment of this disclosure.

With reference to FIG. 7, shown is a block diagram of an FSS server and agent architecture including ransomware detection according to an exemplary embodiment of this disclosure. As shown, the architecture includes a server sync engine 702, and agent sync engine 712 and an agent protocol to facilitate communications between the server sync engine 702 and agent sync engine 712.

The server sync engine 702 includes a database 704 that includes file versions per agent status, an executor thread pool 706, an outgoing command queue 708, and an incoming API processor 710 including a ransomware watcher module. The server sync engine is operatively associated with a volume storage device 722.

The agent sync engine 712 includes a state processor 714 including a sync state database 720, a scheduler 716 and a transfer module/cache/signature/encryption status calculation module 718. The agent sync engine 712 is operatively associated with a file system 732 to monitor and detect watcher events and facilitate file I/O between the file system and the agent sync engine 712.

According to an exemplary embodiment, encryption status detection/entropy parameters are calculated on the transfer module which resides on a desktop-agent. These values are calculated when an agent receives files from the sync-server, or when a file is created or modified on the desktop agent sync-engine. The encryption/entropy parameters are stored in a local database, i.e., SyncState., and are sent to the server together with a new or a modified file. If a file is deleted locally, the parameters for the deleted file can be retrieved from the local database residing in the server side. The Server Sync Engine API processor creates a ransomware watcher for the agent, if an encrypted file is received, and subsequently provides information to the watcher as new files or delete file requests arrive from the agent. It is to be understood that the encryption/entropy calculations and watcher can both reside on a client device, such as desktop computer, PC, etc. Furthermore, the encryption/entropy calculations and watcher can both reside on a server or other device which receives files from one or more client devices over a network.

Figure 8:
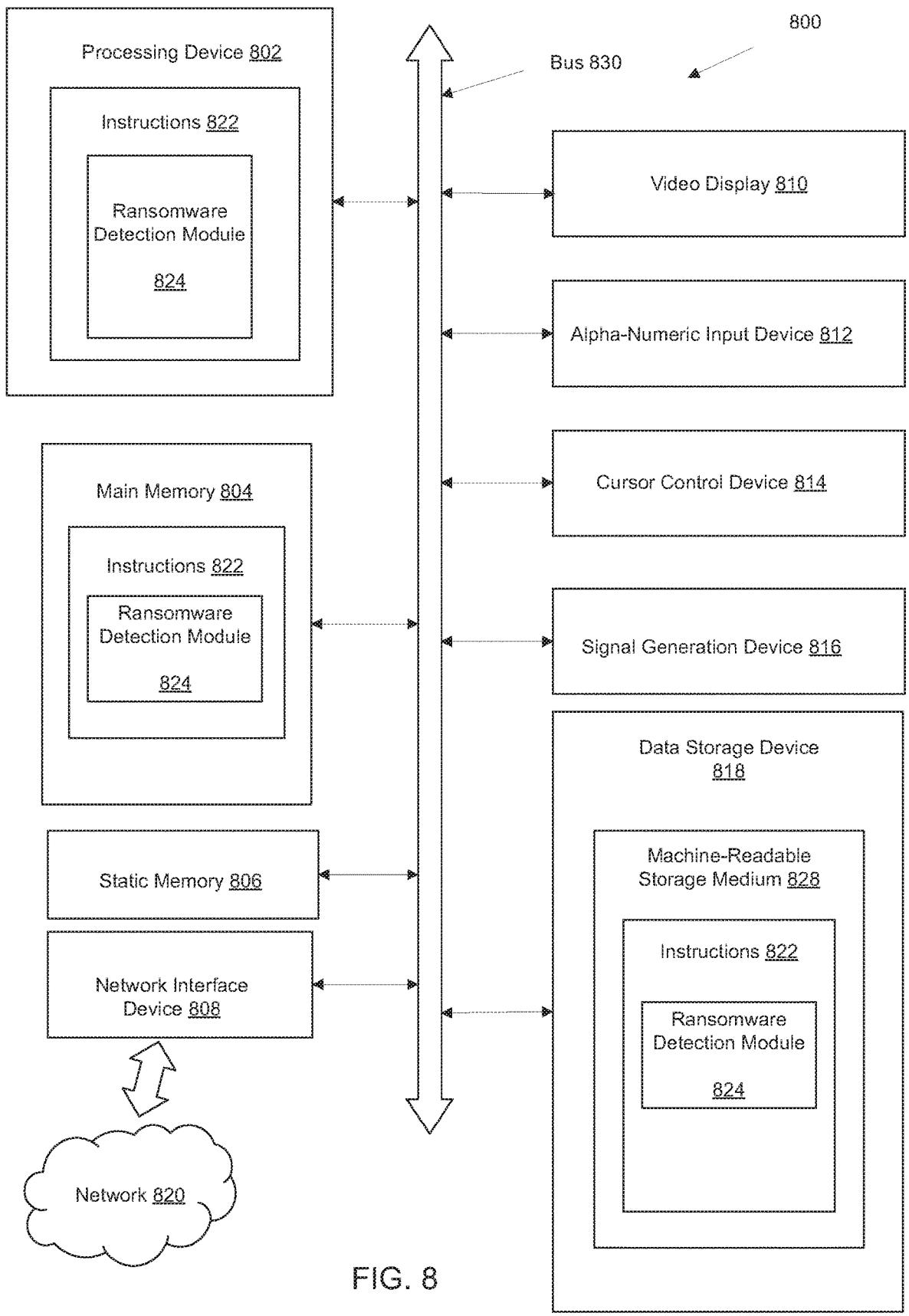
FIG. 8 is a block diagram of a computer system with a set of instructions to perform a ransomware detection method according to an exemplary embodiment of this disclosure.

With reference to FIG. 8, shown is a block diagram of a computer system with a set of instructions to perform a ransomware detection method according to an exemplary embodiment of this disclosure.

FIG. 8 illustrates an example machine of a computer system 800 within which a set of instructions, for causing the machine to perform any one or more of the methodologies discussed herein, may be executed. For example, client devices, agent modules, master FSS server, and/or Storage-Servers may be implemented on machines similar to computer system 800. According to various embodiments, the machine may be connected (e.g., networked 820) to other machines in a LAN, an intranet, an extranet, and/or the Internet. The machine may operate in the capacity of a server or a client machine in a client-server network environment, or as a peer machine in a peer-to-peer (or distributed) network environment.

The machine and devices described herein may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, a graphical processing unit (GPU), or the like. The processing device 802 is configured to execute instructions 822 for performing the operations and steps discussed herein.

The computing system 800 may further include a network interface device 808. The computing system 800 also may optionally include a video display unit 810 (e.g., a liquid crystal display (LCD), Light Emitting Diode (LED) monitor, or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium 828 (also known as a computer-readable medium) on which is stored one or more sets of instructions 822 or software embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting machine-readable storage media.

In one implementation, the instructions 822 include instructions for a ransomware detection module 824, and/or a software library containing methods that can be called by the ransomware detection module 824. The instructions in the ransomware detection module 824 and/or the software library may be used to implement the methods as described above in relation to FIGS. 1-7. While the machine-readable storage medium 828 is shown in an example implementation to be a single medium, the term "machine-readable storage medium" includes a single medium or multiple media (e.g., a centralized or distributed database, and/or associated caches and servers) that store the one or more sets of instructions. The term "machine-readable storage medium" also includes any medium that is capable of storing or encoding a set of instructions for execution by the machine and that cause the machine to perform any one or more of the methodologies of the present disclosure. The term "machine-readable storage medium" accordingly includes, but is not limited to, solid-state memories, optical media and magnetic media.

Figure 9:
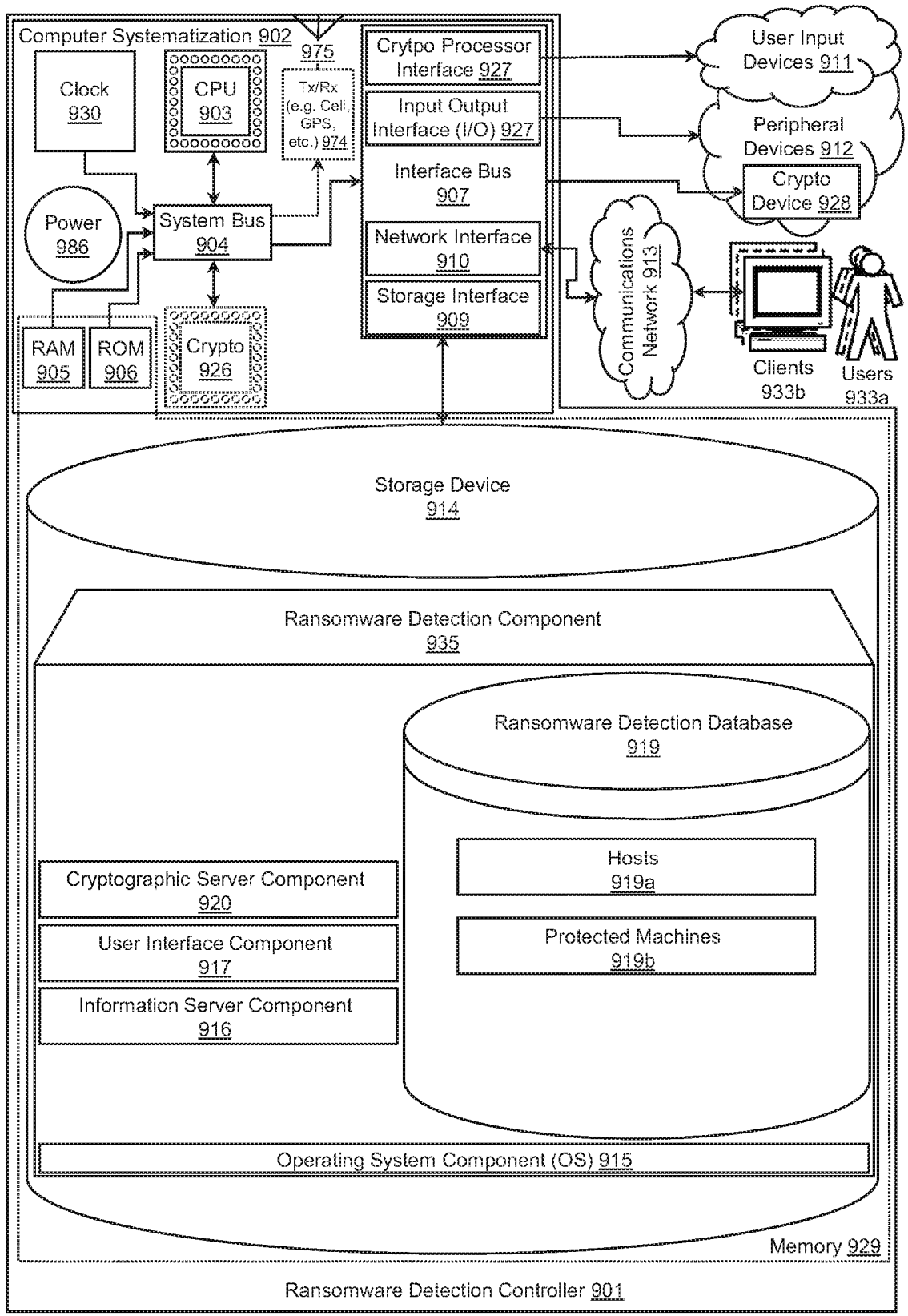
FIG. 9 is a block diagram of a system for managing the transfer of files associated with one or more client devices including ransomware detection module according to an exemplary embodiment of this disclosure.

With reference to FIG. 9, shown is a block diagram of a system for managing the transfer of files associated with one or more client devices including ransomware detection according to an exemplary embodiment of this disclosure.

FIG. 9 shows a block diagram illustrating embodiments of a ransomware detection controller, according to some embodiments. In this embodiment, the ransomware detection controller 901 may serve to aggregate, process, store, search, serve, identify, instruct, generate, match, and/or facilitate interactions with a computer through various technologies, and/or other related data. The ransomware detection controller can, for example, be configured such that the various components described herein execute on the client device, the computer, and the ransomware detection server. Because each component of the ransomware detection controller may be distributed, as described below, the client device, the computer, and the ransomware detection server can perform portions of the program logic assigned to them or portions of the program logic normally assigned to the other. In another example, the ransomware detection component 935, the cryptographic server component 920, the user interface component 917, and/or the information server component 916 can execute on one or more local servers. In an alternative configuration, the ransomware detection component 935, the cryptographic server component 920, the user interface component 917, and/or the information server component 916 can be installed on one or more remote servers and provide services to a user and client device via the networked program execution capabilities described below.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the ransomware detection controller 901 may be connected to and/or communicate with entities such as, but not limited to: one or more users from user input devices 911; peripheral devices 912; an optional cryptographic processor device 928; and/or a communications network 913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communication network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The ransomware detection controller 901 may be based on computer systems that comprise, but are not limited to, components such as: a computer systematization 902 connected to memory 929.

Computer Systematization

A computer systematization 902 may comprise a clock 930, central processing unit ("CPU(s)" and/or "processor(s)" (these terms are used interchangeably throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effectuate communications, operations, storage, etc. The computer systematization may be connected to a power source 986; e.g., optionally the power source may be internal. Optionally, a cryptographic processor 926 and/or transceivers (e.g., ICs) 974 may be connected to the system bus. In another embodiment, the cryptographic processor and/or transceivers may be connected as either internal and/or external peripheral devices 912 via the interface bus I/O. In turn, the transceivers may be connected to antenna(s) 975, thereby effectuating wireless transmission and reception of various communications and/or sensor protocols; for example the antenna(s) may connect to: a Texas Instrument WiLink WL1283 transceiver chip (e.g., providing 802.11n, Bluetooth 3.0, FM, global positioning system (GPS) (thereby allowing the ransomware detection controller to determine its location)); Broadcom BCM4329FKUBG transceiver chip (e.g., providing 802.11n, Bluetooth 2.1+ EDR, FM, etc.); a Broadcom BCM475501UB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decide allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the ransomware detection controller and beyond through various interfaces. Should processing requirements dictate a greater amount speed and/or capacity, distributed processors, mainframe, multi-core, parallel, and/or super-computer architectures may similarly be employed. Alternatively, should deployment requirements dictate greater portability, smaller Personal Digital Assistants (PDAs) may be employed. Depending on the particular implementation, features of the ransomware detection controller may be achieved by implementing a microcontroller such as CAST's R8051XC2 microcontroller; Intel's MCS 51 (i.e., 8051 microcontroller); and/or the like. Also, to implement certain features of the ransomware detection controller, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the ransomware detection controller's component collection (distributed or otherwise) and/or features may be implemented via the microprocessor and/or via embedded components; e.g., via ASIC, coprocessor, DSP, FPGA, and/or the like. Alternately, some implementations of the ransomware detection controller may be implemented with embedded components that are configured and used to achieve a variety of features or signal processing.

Depending on the particular implementation, the embedded components may include software solutions, hardware solutions, and/or some combination of both hardware/software solutions. For example, ransomware detection controller features discussed herein may be achieved through implementing FPGAs, which are a semiconductor devices containing programmable logic components called "logic blocks," and programmable interconnects, such as the high performance FPGA Virtex series and/or the low cost Spartan series manufactured by Xilinx. Logic blocks and interconnects can be programmed by the customer or designer, after the FPGA is manufactured, to implement any of the ransomware detection controller features. A hierarchy of programmable interconnects allow logic blocks to be interconnected as needed by the ransomware detection controller system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the ransomware detection controller may be developed on regular FPGAs and then migrated into a fixed version that more resembles ASIC implementations. Alternate or coordinating implementations may migrate ransomware detection controller features to a final ASIC instead of or in addition to FPGAs. Depending on the implementation all of the aforementioned embedded components and microprocessors may be considered the "CPU" and/or "processor" for the ransomware detection controller.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the ransomware detection controller thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the ransomware detection controller is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controller architectures may similarly be employed to pool, load balance, and/or otherwise increase the communicative bandwidth required by the ransomware detection controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 911 often are a type of peripheral device 912 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the ransomware detection controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 928), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the ransomware detection controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the ransomware detection controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the ransomware detection controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 929 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., Blu-eray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component 915; information server component 916; user interface component 917; cryptographic server component 920; ransomware detection analytics component 943; and/or the like (i.e., collectively a component collection). The aforementioned components may be incorporated into (e.g., be sub-components of), loaded from, loaded by, or otherwise operatively available to and from the ransomware detection component(s) 935.

Any component may be stored and accessed from the storage devices and/or from storage devices accessible through an interface bus. Although program components such as those in the component collection, typically, are stored in a local storage device 914, they may also be loaded and/or stored in other memory such as: remote "cloud"

storage facilities accessible through a communications network; integrated ROM memory; via an FPGA or ASIC implementing component logic; and/or the like.

Operating System Component

The operating system component 915 is an executable program component facilitating the operation of the ransomware detection controller. Typically, the operating system facilitates access of I/O, network interfaces, peripheral devices, storage devices, and/or the like. The operating system may be a highly fault tolerant, scalable, and secure system such as: Unix and Unix-like system distributions (such as AT&T's UNIX; Berkley Software Distribution (BSD) variations such as FreeBSD, NetBSD, OpenBSD, and/or the like; Linux distributions such as Red Hat, Debian, Ubuntu, and/or the like); and/or the like operating systems. However, more limited and/or less secure operating systems also may be employed such as Apple OS-X, Microsoft Windows 2000/2003/3.1/95/98/CE/Millenium/NT/Vista/XP/Win7 (Server), and/or the like. An operating system may communicate to and/or with other components in a component collection, including itself, and/or the like. Most frequently, the operating system communicates with other program components, user interfaces, and/or the like. The operating system, once executed by the CPU, may enable the interaction with communications networks, data, I/O, peripheral devices, program components, memory, user input devices, and/or the like. The operating system may provide communications protocols that allow the ransomware detection controller to communicate with other entities through a communications network 913. Various communication protocols may be used by the ransomware detection controller as a subcarrier transport mechanism for interaction, such as, but not limited to: multicast, TCP/IP, UDP, unicast, and/or the like.

Information Server Component

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective−) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., ICQ, Internet Relay Chat (IRC), Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Representational State Transfer (REST) and/or the like. The information server provides results in the form of Web pages to Web browsers and allows for the manipulated generation of the Web pages through interaction with other program components. After a Domain Name System (DNS) resolution portion of an HTTP request is resolved to a particular information server, the information server resolves requests for information at specified locations on the ransomware detection controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port, and/or the like. An information server may communicate to and/or with other components in a component collection, including itself, and/or facilities of the like. Most frequently, the information server communicates with the ransomware detection database component 919, operating system component 915, other program components, user interfaces, and/or the like.

Access from the Information Server Component 916 to the ransomware detection database component 919 may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ransomware detection controller. In one embodiment, the information server would provide a Web form accessible by a Web browser. Entries made into supplied fields in the Web form are tagged as having been entered into the particular fields and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the ransomware detection controller as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser. Also, an information server may contain, communicate, generate, obtain, and/or provide program component, system, user, and/or data communications, requests, and/or responses.

User Interface Component

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows, web interface libraries such as, but not limited to, Dojo, jQuery UI, MooTools, Prototype, script.aculo.us, SWFObject, Yahoo! User Interface, any of which may be used and provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating system component 915, other program components, and/or the like. The user interface may contain, communicate, generate, obtain, and/or provide program component, system, user, and/or data communications, requests, and/or responses.

Cryptographic Server Component

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael (AES), RSA, Secure Hash Algorithm (SHA), Secure Socket Layer (SSL), Secure Hypertext Transfer Protocol (HTTPS), and/or the like. Employing such encryption security protocols, the ransomware detection controller may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the ransomware detection controller component to engage in secure transactions if so desired. The cryptographic component facilitates the secure accessing of resources on the ransomware detection controller and facilitates the access of secured resources on remote systems; i.e., it may act as a client and/or server of secured resources. Most frequently, the cryptographic component communicates with information server component 916, operating system component 915, other program components, and/or the like. The cryptographic component may contain, communicate, generate, obtain, and/or provide program component, system, user, and/or data communications, requests, and/or responses.

Ransomware Detection Database Component

The ransomware detection database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the ransomware detection database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the ransomware detection database component 919 includes several tables 919a-b. A hosts table 919a may contain columns such as host ID, host IP address, host last backup time, host up time, and OS version. Protected Machines table 919b may contain columns such as device and agent ID.

In one embodiment, user programs may contain various user interface primitives, which may serve to update the ransomware detection controller. Also, various accounts may require custom database tables depending upon the environments and the types of clients the ransomware detection controller may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919a-b. The ransomware detection controller may be configured to keep track of various settings, inputs, and parameters via database controllers.

The ransomware detection database may communicate to and/or with other components in a component collection, including itself, and/or facilities of the like. Most frequently, the ransomware detection database communicates with the ransomware detection component 935, other program components, and/or the like. The database may contain, retain, and provide information regarding other nodes and data.

Distributed Ransomware Detection Components

The structure and/or operation of any of the ransomware detection controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the ransomware detection controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through interapplication data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, Representational State Transfer (REST), process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

Disclosed herein are exemplary embodiments including, but not limited to the following:

[A1] A processor implemented method for detecting a ransomware infection in a plurality of files received by a device operatively associated with a file synchronization and sharing network, each file including a plurality of sequential bytes of digital information, the method comprising: a) determining a value-count of byte values included in a file section associated with a received file, the value-count including a count of byte value occurrences of the byte values included in the file section; b) performing a low frequency analysis of the file section to determine if the file section is low frequency encrypted, the low frequency analysis including b1) calculating one or both of a low frequency entropy value associated with the file section and a low frequency average value of all byte values associated with the file section, the low frequency entropy value associated with the count of byte value occurrences of the byte values included in the file section, and b2) comparing one or both of the calculated low frequency entropy value to a low frequency entropy threshold value and the calculated low frequency average value of all byte values to a low frequency average value range threshold to determine if the received file is low frequency encrypted; c) performing a high frequency analysis of the file section to determine if the file section is high frequency encrypted, the high frequency analysis including c1) calculating one or both of a high frequency entropy value associated with the file section and a high frequency high-low probability ratio value associated with the file section, the high frequency entropy value associated with a plurality of subsection entropy values where each subsection entropy value is calculated for one of a plurality of consecutive subsections of bytes included in the file section, and the high frequency high-low probability ratio is calculated by dividing a high probability measure of a byte value by a low probability measure of a byte value included in the file section, and c2) comparing one or both of the calculated high frequency entropy value to a high frequency entropy threshold value and the calculated high frequency high-low probability ratio to a high frequency high-low probability threshold to determine if the received file is high frequency encrypted; d) if the file section is low frequency encrypted and high frequency encrypted, setting an encryption status condition associated with the received file to indicate the received file is encrypted; and e) if the received file encryption status condition indicates the received file is encrypted, utilizing a watcher to monitor file events associated with the plurality of files received by the device associated with the file synchronization and sharing network to determine if one or more of the plurality of files are ransomware infected.

[A2] The processor implemented method for detecting a ransomware infection in a plurality of files according to paragraph [A1], wherein the value-count includes a total number of byte value occurrences in the file section for each possible byte value, and a)-d) are repeated for each of the plurality of files received by the device associated with the file synchronization and sharing network.

[A3] The processor implemented method for detecting a ransomware infection in a plurality of files according to paragraph [A1], further comprising: setting the encryption status condition as true if one or both of a) the calculated low frequency entropy value is greater than or equal to the low frequency entropy threshold value indicating low frequency encryption of the received file, and b) the calculated low frequency average value of substantially all byte values is outside the low frequency average value range threshold indicating low frequency encryption of the received file, and one or both of c) the calculated high frequency entropy value is greater than or equal to the high frequency entropy threshold value indicating high frequency encryption of the received file and d) the calculated high frequency high-low probability ratio value is less than or equal to the high frequency high-low probability threshold value indicating high frequency encryption of the received file.

[A4] The processor implemented method for detecting a ransomware infection in a plurality of files according to paragraph [A1], wherein the low frequency analysis of the file section b1) calculates the low frequency entropy value associated with the file section and calculates the low frequency average value of substantially all byte values associated with the file section, and b2) compares the calculated low frequency entropy value to the low frequency entropy threshold value and compares the calculated low frequency average value of substantially all byte values to the low frequency average value range threshold to determine if the received file is low frequency encrypted.

[A5] The processor implemented method for detecting a ransomware infection in a plurality of files according to paragraph [A1], wherein the high frequency analysis of the file section c1a) calculates a high frequency entropy value for each of one or more of the plurality of subsections of bytes, c1b) calculates a high frequency average entropy value of the one or more plurality of subsection bytes, and c1c) determines a low calculated high frequency entropy value of the one or more plurality of subsection bytes, and c2a) compares the calculated high frequency average entropy value of the one or more plurality of subsection bytes to a high frequency entropy average threshold, c2b) compares the low calculated high frequency entropy value of the one or more plurality of subsection bytes to a high frequency entropy minimum threshold and c2c) compares the calculated high frequency high-low probability ratio value to a high frequency high-low probability threshold value to determine if the received file is high frequency encrypted.

[A6] The processor implemented method for detecting a ransomware infection in a plurality of files according to paragraph [A1], wherein the low frequency analysis of the file section b1) calculates the low frequency entropy value associated with the file section and calculates the low frequency average value of substantially all byte values associated with the file section, and b2) compares the calculated low frequency entropy value to the low frequency entropy threshold value and compares the calculated low frequency average value of substantially all byte values to the low frequency average value range threshold to determine if the received file is low frequency encrypted, and wherein the high frequency analysis of the file section c1a) calculates a high frequency entropy value for each of one or more of the plurality of subsections of bytes, c1b) calculates a high frequency average entropy value of the one or more plurality of subsection bytes, and c1c) determines a low calculated high frequency entropy value of the one or more plurality of subsection bytes, and c2a) compares the calculated high frequency average entropy value of the one or more plurality of subsection bytes to a high frequency entropy average threshold, c2b) compares the low calculated high frequency entropy value of the one or more plurality of subsection bytes to a high frequency entropy minimum threshold and c2c) compares the calculated high frequency high-low probability ratio value to a high frequency high-low probability threshold value to determine if the received file is high frequency encrypted.

[A7] The processor implemented method for detecting a ransomware infection in a plurality of files according to paragraph [A6], wherein the low frequency entropy threshold value is 7.92, the low frequency average value range threshold is 125-130, the plurality of subsections of bytes includes 256 bytes, the high frequency entropy average threshold is 7.1, the high frequency entropy minimum threshold is 6.25, and the high frequency high-low probability threshold value is 5.

[A8] The processor implemented method for detecting a ransomware infection in a plurality of files according to paragraph [A1], wherein the file events monitored by the watcher include one or more of a total number of received encrypted files, percentage of received encrypted files relative to received unencrypted files, average time between received files, creation time of the received encrypted files, time stamps of the received files; file extensions of the received encrypted files; total number of deleted encrypted files; total number of deleted unencrypted files; and file folders associated with deleted files.

[A9] The processor implemented method for detecting a ransomware infection in a plurality of files according to paragraph [A8], further comprising: triggering a ransomware alert if any one or more of the following conditions are true: the percentage of received encrypted files relative to received unencrypted files is greater than 75%; the average time between received files is less than 10 seconds; the creation time of the received encrypted files is recent; the time stamps of the received files are not equivalent; more than 50% of the file extensions of the received encrypted files are the same; more than 50% of the encrypted received files include an unknown file extension; the total number of deleted files is greater than 75% of the total number of encrypted files; more than 50% of the deleted files are not encrypted; more than 50% of the deleted files have known file extensions; and more than 50% of the deleted files are in the same file folders as new encrypted files received.

[A10] The processor implemented method for detecting a ransomware infection in a plurality of files according to paragraph [A9], further comprising: disabling the device operatively associated with the file synchronization and sharing network if a ransomware alert is triggered. [A11] The processor implemented method for detecting a ransomware infection in a plurality of files according to paragraph [A1], wherein the watcher monitors the plurality of file events associated with the plurality of files received by the device, generates a ransomware evaluation output value based on the monitored plurality of file events and compares the ransomware evaluation output value to a ransomware alert threshold value to determine if one or more of the plurality of files are ransomware infected.

[A12] The processor implemented method for detecting a ransomware infection in a plurality of files according to paragraph [A11], wherein the watcher monitors the plurality of file event and associated file event times associated with the plurality of files received by the device, and generates a ransomware evaluation output value based on the monitored plurality of file events and associated file event times.

[A13] The processor implemented method for detecting a ransomware infection in a plurality of files according to paragraph [A11], wherein each of the monitored plurality of file events is associated with one of a plurality of weighting values, and the ransomware evaluation output value is based on the monitored plurality of file events and their respective weighting value.

[A14] The processor implemented method for detecting a ransomware infection in a plurality of files according to paragraph [A13], wherein the watcher includes a plurality of counters associated with the monitored plurality of file events and the watcher sets a file event condition as true if a counter associated with the file event exceeds a counter threshold value associated with the file event, each of the file event conditions is associated with one of the plurality of weighting values, and the ransomware evaluation output value is generated based on the file event conditions and associated plurality of weighting values.

[A15] The processor implemented method for detecting a ransomware infection in a plurality of files according to paragraph [A1], further comprising: if the watcher determines one or more of the plurality of files are ransomware infected, generating a ransomware alert signature associated with the plurality of files; and triggering a ransomware alert if the ransomware alert signature is not associated with a nonthreat ransomware alert signature.

[A16] The processor implemented method for detecting a ransomware infection in a plurality of files according to paragraph [A1], wherein the watcher monitors the plurality of file events associated with the plurality of files received by the device, generates a ransomware evaluation output value based on the monitored plurality of file events and compares the ransomware evaluation output value to a ransomware alert threshold value to determine if one or more of the plurality of files are ransomware infected; wherein the watcher includes a plurality of counters associated with the monitored plurality of file events and the watcher sets a file event condition as true if a counter associated with the file event exceeds a counter threshold value associated with the file event, each of the file event conditions is associated with one of the plurality of weighting values, and the ransomware evaluation output value is generated based on the file event conditions and associated plurality of weighting values; if the watcher determines one or more of the plurality of files are ransomware infected, generating a ransomware alert signature associated with the plurality of files based on the plurality of counters; and triggering a ransomware alert if the ransomware alert signature is not associated with a nonthreat ransomware alert signature.

[A17] The processor implemented method for detecting a ransomware infection in a plurality of files according to paragraph [A16], wherein the ransomware alert signature is associated with a bit-pattern representation of the plurality of counters and a file extension associated with most of the encrypted files.

[A18] The processor implemented method for detecting a ransomware infection in a plurality of files according to paragraph [A1], wherein one or both of the low frequency analysis and high frequency analysis includes one or more of: Shannon entropy values; Chi-Squared test; mean byte values; and a Monte Carlo method to approximate pi to indicate randomness of the byte values.

[A19] The processor implemented method for detecting a ransomware infection in a plurality of files according to paragraph [A1], wherein one or more of the low frequency threshold value, the low frequency average value range threshold, the high frequency entropy threshold value and the high frequency high-low probability threshold value are dependent on a size of the file section.

[A20] The processor implemented method for detecting a ransomware infection in a plurality of files according to paragraph [A1], wherein a)-d) are performed by a local agent module operatively associated with the device and e) is performed by one of a local network server and remote cloud based server operatively associated with the device.

[A21] A ransomware detection module operatively associated with a computer device for detecting a ransomware infection in a plurality of files received by the ransomware detection module, each file including a plurality of sequential bytes of digital information, and the ransomware detection module configured to perform a method comprising: a) determining a value-count of byte values included in a file section associated with a received file, the value-count including a count of byte value occurrences of the byte values included in the file section; b) performing a low frequency analysis of the file section to determine if the file section is low frequency encrypted, the low frequency analysis including b1) calculating one or both of a low frequency entropy value associated with the file section and a low frequency average value of substantially all byte values associated with the file section, the low frequency entropy value associated with the count of byte value occurrences of the byte values included in the file section, and b2) comparing one or both of the calculated low frequency entropy value to a low frequency entropy threshold value and the calculated low frequency average value of substantially all byte values to a low frequency average value range threshold to determine if the received file is low frequency encrypted; c) performing a high frequency analysis of the file section to determine if the file section is high frequency encrypted, the high frequency analysis including c1) calculating one or both of a high frequency entropy value associated with the file section and a high frequency high-low probability ratio value associated with the file section, the high frequency entropy value associated with a plurality of subsection entropy values where each subsection entropy value is calculated for one of a plurality of consecutive subsections of bytes included in the file section, and the high frequency high-low probability ratio is calculated by dividing a high probability measure of a byte value by a low probability measure of a byte value included in the file section, and c2) comparing one or both of the calculated high frequency entropy value to a high frequency entropy threshold value and the calculated high frequency high-low probability ratio to a high frequency high-low probability threshold to determine if the received file is high frequency encrypted; d) if the file section is low frequency encrypted and high frequency encrypted, setting an encryption status condition associated with the received file to indicate the received file is encrypted; and e) if the received file encryption status condition indicates the received file is encrypted, utilizing a watcher to monitor file events associated with the plurality of files received by the device to determine if one or more of the plurality of files are ransomware infected.

[A22] The ransomware detection module operatively associated with a computer device for detecting a ransomware infection in a plurality of files according to paragraph [A21], wherein the value-count includes a total number of byte value occurrences in the file section for each possible byte value, and a)-d) are repeated for each of the plurality of files received by the device.

[A23] The ransomware detection module operatively associated with a computer device for detecting a ransomware infection in a plurality of files according to paragraph

[A21], further comprising: setting the encryption status condition as true if one or both of a) the calculated low frequency entropy value is greater than or equal to the low frequency entropy threshold value indicating low frequency encryption of the received file, and b) the calculated low frequency average value of substantially all byte values is outside the low frequency average value range threshold indicating low frequency encryption of the received file, and one or both of c) the calculated high frequency entropy value is greater than or equal to the high frequency entropy threshold value indicating high frequency encryption of the received file and d) the calculated high frequency high-low probability ratio value is less than or equal to the high frequency high-low probability threshold value indicating high frequency encryption of the received file.

[A24] The ransomware detection module operatively associated with a computer device for detecting a ransomware infection in a plurality of files according to paragraph [A21], wherein the low frequency analysis of the file section b1) calculates the low frequency entropy value associated with the file section and calculates the low frequency average value of substantially all byte values associated with the file section, and b2) compares the calculated low frequency entropy value to the low frequency entropy threshold value and compares the calculated low frequency average value of substantially all byte values to the low frequency average value range threshold to determine if the received file is low frequency encrypted.

[A25] The ransomware detection module operatively associated with a computer device for detecting a ransomware infection in a plurality of files according to paragraph [A21], wherein the high frequency analysis of the file section c1a) calculates a high frequency entropy value for each of one or more of the plurality of subsections of bytes, c1b) calculates a high frequency average entropy value of the one or more plurality of subsection bytes, and c1 c) determines a low calculated high frequency entropy value of the one or more plurality of subsection bytes, and c2a) compares the calculated high frequency average entropy value of the one or more plurality of subsection bytes to a high frequency entropy average threshold, c2b) compares the low calculated high frequency entropy value of the one or more plurality of subsection bytes to a high frequency entropy minimum threshold and c2c) compares the calculated high frequency high-low probability ratio value to a high frequency high-low probability threshold value to determine if the received file is high frequency encrypted.

[A26] The ransomware detection module operatively associated with a computer device for detecting a ransomware infection in a plurality of files according to paragraph [A21], wherein the low frequency analysis of the file section b1) calculates the low frequency entropy value associated with the file section and calculates the low frequency average value of substantially all byte values associated with the file section, and b2) compares the calculated low frequency entropy value to the low frequency entropy threshold value and compares the calculated low frequency average value of substantially all byte values to the low frequency average value range threshold to determine if the received file is low frequency encrypted, and wherein the high frequency analysis of the file section c1a) calculates a high frequency entropy value for each of one or more of the plurality of subsections of bytes, c1b) calculates a high frequency average entropy value of the one or more plurality of subsection bytes, and c1c) determines a low calculated high frequency entropy value of the one or more plurality of subsection bytes, and c2a) compares the calculated high frequency average entropy value of the one or more plurality of subsection bytes to a high frequency entropy average threshold, c2b) compares the low calculated high frequency entropy value of the one or more plurality of subsection bytes to a high frequency entropy minimum threshold and c2c) compares the calculated high frequency high-low probability ratio value to a high frequency high-low probability threshold value to determine if the received file is high frequency encrypted.

[A27] The ransomware detection module operatively associated with a computer device for detecting a ransomware infection in a plurality of files according to paragraph [A26], wherein the low frequency entropy threshold value is 7.92, the low frequency average value range threshold is 125-130, the plurality of subsections of bytes includes 256 bytes, the high frequency entropy average threshold is 7.1, the high frequency entropy minimum threshold is 6.25, and the high frequency high-low probability threshold value is 5.

[A28] The ransomware detection module operatively associated with a computer device for detecting a ransomware infection in a plurality of files according to paragraph [A21], wherein the file events monitored by the watcher include one or more of a total number of received encrypted files, percentage of received encrypted files relative to received unencrypted files, average time between received files, creation time of the received encrypted files, time stamps of the received files; file extensions of the received encrypted files; total number of deleted encrypted files; total number of deleted unencrypted files; and file folders associated with deleted files.

[A29] The ransomware detection module operatively associated with a computer device for detecting a ransomware infection in a plurality of files according to paragraph [A28], further comprising: triggering a ransomware alert if any one or more of the following conditions are true: triggering a ransomware alert if any one or more of the following conditions are true: the percentage of received encrypted files relative to received unencrypted files is greater than 75%; the average time between received files is less than 10 seconds; the creation time of the received encrypted files is recent; the time stamps of the received files are not equivalent; more than 50% of the file extensions of the received encrypted files are the same; more than 50% of the encrypted received files include an unknown file extension; the total number of deleted files is greater than 75% of the total number of encrypted files; more than 50% of the deleted files are not encrypted; more than 50% of the deleted files have known file extensions; and more than 50% of the deleted files are in the same file folders as new encrypted files received.

[A30] The ransomware detection module operatively associated with a computer device for detecting a ransomware infection in a plurality of files according to paragraph [A29], further comprising: disabling the device if a ransomware alert is triggered.

[A31] The ransomware detection module operatively associated with a computer device for detecting a ransomware infection in a plurality of files according to paragraph [A21], wherein the watcher monitors the plurality of file events associated with the plurality of files received by the device, generates a ransomware evaluation output value based on the monitored plurality of file events and compares the ransomware evaluation output value to a ransomware alert threshold value to determine if one or more of the plurality of files are ransomware infected.

[A32] The ransomware detection module operatively associated with a computer device for detecting a ransomware infection in a plurality of files according to paragraph [A31], wherein the watcher monitors the plurality of file event and associated file event times associated with the plurality of files received by the device, and generates a ransomware evaluation output value based on the monitored plurality of file events and associated file event times.

[A33] The ransomware detection module operatively associated with a computer device for detecting a ransomware infection in a plurality of files according to paragraph [A21], wherein each of the monitored plurality of file events is associated with one of a plurality of weighting values, and the ransomware evaluation output value is based on the monitored plurality of file events and their respective weighting value.

[A34] The ransomware detection module operatively associated with a computer device for detecting a ransomware infection in a plurality of files according to paragraph [A33], wherein the watcher includes a plurality of counters associated with the monitored plurality of file events and the watcher sets a file event condition as true if a counter associated with the file event exceeds a counter threshold value associated with the file event, each of the file event conditions is associated with one of the plurality of weighting values, and the ransomware evaluation output value is generated based on the file event conditions and associated plurality of weighting values.

[A35] The ransomware detection module operatively associated with a computer device for detecting a ransomware infection in a plurality of files according to paragraph [A21], further comprising: if the watcher determines one or more of the plurality of files are ransomware infected, generating a ransomware alert signature associated with the plurality of files; and triggering a ransomware alert if the ransomware alert signature is not associated with a nonthreat ransomware alert signature.

[A36] The ransomware detection module operatively associated with a computer device for detecting a ransomware infection in a plurality of files according to paragraph [A21], wherein the watcher monitors the plurality of file events associated with the plurality of files received by the device, generates a ransomware evaluation output value based on the monitored plurality of file events and compares the ransomware evaluation output value to a ransomware alert threshold value to determine if one or more of the plurality of files are ransomware infected; wherein the watcher includes a plurality of counters associated with the monitored plurality of file events and the watcher sets a file event condition as true if a counter associated with the file event exceeds a counter threshold value associated with the file event, each of the file event conditions is associated with one of the plurality of weighting values, and the ransomware evaluation output value is generated based on the file event conditions and associated plurality of weighting values; if the watcher determines one or more of the plurality of files are ransomware infected, generating a ransomware alert signature associated with the plurality of files based on the plurality of counters; and triggering a ransomware alert if the ransomware alert signature is not associated with a nonthreat ransomware alert signature.

[A37] The ransomware detection module operatively associated with a computer device for detecting a ransomware infection in a plurality of files according to paragraph [A36], wherein the ransomware alert signature is associated with a bit-pattern representation of the plurality of counters and a file extension associated with most of the encrypted files.

[A38] The ransomware detection module operatively associated with a computer device for detecting a ransomware infection in a plurality of files according to paragraph [A21], wherein one or both of the low frequency analysis and high frequency analysis includes one or more of: Shannon entropy values; Chi-Squared test; mean byte values; and a Monte Carlo method to approximate pi to indicate randomness of the byte values.

[A39] The ransomware detection module operatively associated with a computer device for detecting a ransomware infection in a plurality of files according to paragraph [A21], wherein one or more of the low frequency threshold value, the low frequency average value range threshold, the high frequency entropy threshold value and the high frequency high-low probability threshold value are dependent on a size of the file section.

[A40] The ransomware detection module operatively associated with a computer device for detecting a ransomware infection in a plurality of files according to paragraph [A21], wherein a)-d) are performed by a local agent module operatively associated with the device and e) is performed by one of a local network server and remote cloud based server operatively associated with the device.

[A41] A file synchronization and sharing computer network for synchronizing and sharing files and detecting a ransomware infection in a plurality of files received by a device operatively associated with the network, each file including a plurality of sequential bytes of digital information and the file synchronization and sharing computer network comprising: a network of a plurality of computer devices operatively associated with a common server network including one or more servers configured to synchronize and share files between the plurality of computer devices; one or more agent modules operatively associated with the network of plurality of computer devices and the common server network, the one or more agent modules and the one or more servers configured to: a) determine a value-count of byte values included in a file section associated with a received file, the value-count including a count of byte value occurrences of the byte values included in the file section; b) perform a low frequency analysis of the file section to determine if the file section is low frequency encrypted, the low frequency analysis including b1) calculating one or both of a low frequency entropy value associated with the file section and a low frequency average value of substantially all byte values associated with the file section, the low frequency entropy value associated with the count of byte value occurrences of the byte values included in the file section, and b2) comparing one or both of the calculated low frequency entropy value to a low frequency entropy threshold value and the calculated low frequency average value of substantially all byte values to a low frequency average value range threshold to determine if the received file is low frequency encrypted; c) perform a high frequency analysis of the file section to determine if the file section is high frequency encrypted, the high frequency analysis including c1) calculating one or both of a high frequency entropy value associated with the file section and a high frequency high-low probability ratio value associated with the file section, the high frequency entropy value associated with a plurality of subsection entropy values where each subsection entropy value is calculated for one of a plurality of consecutive subsections of bytes included in the file section, and the high frequency high-low probability ratio is calculated by dividing a high probability measure of a byte value by a low probability measure of a byte value included in the file section, and c2) comparing one or both of the calculated high frequency entropy value to a high frequency entropy threshold value and the calculated high frequency high-low probability ratio to a high frequency high-low probability threshold to determine if the received file is high frequency encrypted; d) if the file section is low frequency encrypted and high frequency encrypted, set an encryption status condition associated with the received file to indicate the received file is encrypted; and e) if the received file encryption status condition indicates the received file is encrypted, utilize a watcher to monitor file events associated with the plurality of files received by the device associated with the file synchronization and sharing network to determine if one or more of the plurality of files are ransomware infected.

[A42] The file synchronization and sharing computer network for synchronizing and sharing files and detecting a ransomware infection in a plurality of files received by a device according to paragraph [A41], wherein the value-count includes a total number of byte value occurrences in the file section for each possible byte value, and the one or more agent modules and the one or more servers further configured to: repeat a)-d) for each of the plurality of files received by the device associated with the file synchronization and sharing computer network.

[A43] The file synchronization and sharing computer network for synchronizing and sharing files and detecting a ransomware infection in a plurality of files received by a device according to paragraph [A41], the one or more agent modules and the one or more servers further configured to: set the encryption status condition as true if one or both of a) the calculated low frequency entropy value is greater than or equal to the low frequency entropy threshold value indicating low frequency encryption of the received file, and b) the calculated low frequency average value of substantially all byte values is outside the low frequency average value range threshold indicating low frequency encryption of the received file, and one or both of c) the calculated high frequency entropy value is greater than or equal to the high frequency entropy threshold value indicating high frequency encryption of the received file and d) the calculated high frequency high-low probability ratio value is less than or equal to the high frequency high-low probability threshold value indicating high frequency encryption of the received file.

[A44] The file synchronization and sharing computer network for synchronizing and sharing files and detecting a ransomware infection in a plurality of files received by a device according to paragraph [A41], wherein the low frequency analysis of the file section b1) calculates the low frequency entropy value associated with the file section and calculates the low frequency average value of substantially all byte values associated with the file section, and b2) compares the calculated low frequency entropy value to the low frequency entropy threshold value and compares the calculated low frequency average value of substantially all byte values to the low frequency average value range threshold to determine if the received file is low frequency encrypted.

[A45] The file synchronization and sharing computer network for synchronizing and sharing files and detecting a ransomware infection in a plurality of files received by a device according to paragraph [A41], wherein the high frequency analysis of the file section c1a) calculates a high frequency entropy value for each of one or more of the plurality of subsections of bytes, c1b) calculates a high frequency average entropy value of the one or more plurality of subsection bytes, and c1c) determines a low calculated high frequency entropy value of the one or more plurality of subsection bytes, and c2a) compares the calculated high frequency average entropy value of the one or more plurality of subsection bytes to a high frequency entropy average threshold, c2b) compares the low calculated high frequency entropy value of the one or more plurality of subsection bytes to a high frequency entropy minimum threshold and c2c) compares the calculated high frequency high-low probability ratio value to a high frequency high-low probability threshold value to determine if the received file is high frequency encrypted.

[A46] The file synchronization and sharing computer network for synchronizing and sharing files and detecting a ransomware infection in a plurality of files received by a device according to paragraph [A41], wherein the low frequency analysis of the file section b1) calculates the low frequency entropy value associated with the file section and calculates the low frequency average value of substantially all byte values associated with the file section, and b2) compares the calculated low frequency entropy value to the low frequency entropy threshold value and compares the calculated low frequency average value of substantially all byte values to the low frequency average value range threshold to determine if the received file is low frequency encrypted, and wherein the high frequency analysis of the file section c1a) calculates a high frequency entropy value for each of one or more of the plurality of subsections of bytes, c1b) calculates a high frequency average entropy value of the one or more plurality of subsection bytes, and c1c) determines a low calculated high frequency entropy value of the one or more plurality of subsection bytes, and c2a) compares the calculated high frequency average entropy value of the one or more plurality of subsection bytes to a high frequency entropy average threshold, c2b) compares the low calculated high frequency entropy value of the one or more plurality of subsection bytes to a high frequency entropy minimum threshold and c2c) compares the calculated high frequency high-low probability ratio value to a high frequency high-low probability threshold value to determine if the received file is high frequency encrypted.

[A47] The file synchronization and sharing computer network for synchronizing and sharing files and detecting a ransomware infection in a plurality of files received by a device according to paragraph [A46], wherein the low frequency entropy threshold value is 7.92, the low frequency average value range threshold is 125-130, the plurality of subsections of bytes includes 256 bytes, the high frequency entropy average threshold is 7.1, the high frequency entropy minimum threshold is 6.25, and the high frequency high-low probability threshold value is 5.

[A48] The file synchronization and sharing computer network for synchronizing and sharing files and detecting a ransomware infection in a plurality of files received by a device according to paragraph [A41], wherein the file events monitored by the watcher include one or more of a total number of received encrypted files, percentage of received encrypted files relative to received unencrypted files, average time between received files, creation time of the received encrypted files, time stamps of the received files; file extensions of the received encrypted files; total number of deleted encrypted files; total number of deleted unencrypted files; and file folders associated with deleted files.

[A49] The file synchronization and sharing computer network for synchronizing and sharing files and detecting a ransomware infection in a plurality of files received by a device according to paragraph [A48], the one or more agent modules and the one or more servers further configured to: trigger a ransomware alert if any one or more of the following conditions are true: the percentage of received encrypted files relative to received unencrypted files is greater than 75%; the average time between received files is less than 10 seconds; the creation time of the received encrypted files is recent; the time stamps of the received files are not equivalent; more than 50% of the file extensions of the received encrypted files are the same; more than 50% of the encrypted received files include an unknown file extension; the total number of deleted files is greater than 75% of the total number of encrypted files; more than 50% of the deleted files are not encrypted; more than 50% of the deleted files have known file extensions; and more than 50% of the deleted files are in the same file folders as new encrypted files received.

[A50] The file synchronization and sharing computer network for synchronizing and sharing files and detecting a ransomware infection in a plurality of files received by a device according to paragraph [A49], the one or more agent modules and the one or more servers further configured to: disable the device operatively associated with the file synchronization and sharing network if a ransomware alert is triggered.

[A51] The file synchronization and sharing computer network for synchronizing and sharing files and detecting a ransomware infection in a plurality of files received by a device according to paragraph [A41], wherein the watcher monitors the plurality of file events associated with the plurality of files received by the device, generates a ransomware evaluation output value based on the monitored plurality of file events and compares the ransomware evaluation output value to a ransomware alert threshold value to determine if one or more of the plurality of files are ransomware infected.

[A52] The file synchronization and sharing computer network for synchronizing and sharing files and detecting a ransomware infection in a plurality of files received by a device according to paragraph [A51], wherein the watcher monitors the plurality of file event and associated file event times associated with the plurality of files received by the device, and generates a ransomware evaluation output value based on the monitored plurality of file events and associated file event times.

[A53] The file synchronization and sharing computer network for synchronizing and sharing files and detecting a ransomware infection in a plurality of files received by a device according to paragraph [A51], wherein each of the monitored plurality of file events is associated with one of a plurality of weighting values, and the ransomware evaluation output value is based on the monitored plurality of file events and their respective weighting value.

[A54] The file synchronization and sharing computer network for synchronizing and sharing files and detecting a ransomware infection in a plurality of files received by a device according to paragraph [A53], wherein the watcher includes a plurality of counters associated with the monitored plurality of file events and the watcher sets a file event condition as true if a counter associated with the file event exceeds a counter threshold value associated with the file event, each of the file event conditions is associated with one of the plurality of weighting values, and the ransomware evaluation output value is generated based on the file event conditions and associated plurality of weighting values.

[A55] The file synchronization and sharing computer network for synchronizing and sharing files and detecting a ransomware infection in a plurality of files received by a device according to paragraph [A41], the one or more agent modules and the one or more servers further configured to: if the watcher determines one or more of the plurality of files are ransomware infected, generate a ransomware alert signature associated with the plurality of files; and trigger a ransomware alert if the ransomware alert signature is not associated with a nonthreat ransomware alert signature.

[A56] The file synchronization and sharing computer network for synchronizing and sharing files and detecting a ransomware infection in a plurality of files received by a device according to paragraph [A41], wherein the watcher monitors the plurality of file events associated with the plurality of files received by the device, generates a ransomware evaluation output value based on the monitored plurality of file events and compares the ransomware evaluation output value to a ransomware alert threshold value to determine if one or more of the plurality of files are ransomware infected; wherein the watcher includes a plurality of counters associated with the monitored plurality of file events and the watcher sets a file event condition as true if a counter associated with the file event exceeds a counter threshold value associated with the file event, each of the file event conditions is associated with one of the plurality of weighting values, and the ransomware evaluation output value is generated based on the file event conditions and associated plurality of weighting values; if the watcher determines one or more of the plurality of files are ransomware infected, generating a ransomware alert signature associated with the plurality of files based on the plurality of counters; and triggering a ransomware alert if the ransomware alert signature is not associated with a nonthreat ransomware alert signature.

[A57] The file synchronization and sharing computer network for synchronizing and sharing files and detecting a ransomware infection in a plurality of files received by a device according to paragraph [A56], wherein the ransomware alert signature is associated with a bit-pattern representation of the plurality of counters and a file extension associated with most of the encrypted files.

[A58] The file synchronization and sharing computer network for synchronizing and sharing files and detecting a ransomware infection in a plurality of files received by a device according to paragraph [A41], wherein one or both of the low frequency analysis and high frequency analysis includes one or more of: Shannon entropy values; Chi-Squared test; mean byte values; and a Monte Carlo method to approximate pi to indicate randomness of the byte values.

[A59] The file synchronization and sharing computer network for synchronizing and sharing files and detecting a ransomware infection in a plurality of files received by a device according to paragraph [A51], wherein one or more of the low frequency threshold value, the low frequency average value range threshold, the high frequency entropy threshold value and the high frequency high-low probability threshold value are dependent on a size of the file section.

[A60] The file synchronization and sharing computer network for synchronizing and sharing files and detecting a ransomware infection in a plurality of files received by a device according to paragraph [A41], wherein a)-d) are performed by the one or more agent modules and e) is performed by a remote cloud based server operatively associated with the file synchronization and sharing computer network.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A processor implemented method for detecting a ransomware infection in a plurality of files received by a device operatively associated with a file synchronization and sharing network, each file including a plurality of sequential bytes of digital information, the method comprising:
   a) determining a value-count of byte values included in a file section associated with a received file, the value-count including a count of byte value occurrences of the byte values included in the file section;
   b) performing a low frequency analysis of the file section to determine if the file section is low frequency encrypted, the low frequency analysis including b1) calculating one or both of a low frequency entropy value associated with the file section and a low frequency average value of all byte values associated with the file section, the low frequency entropy value associated with the count of byte value occurrences of the byte values included in the file section, and b2) comparing one or both of the calculated low frequency entropy value to a low frequency entropy threshold value and the calculated low frequency average value of all byte values to a low frequency average value range threshold to determine if the received file is low frequency encrypted;
   c) performing a high frequency analysis of the file section to determine if the file section is high frequency encrypted, the high frequency analysis including c1) calculating a high frequency entropy value associated with the file section and a high frequency high-low probability ratio value associated with the file section, the high frequency entropy value associated with a plurality of subsection entropy values where each subsection entropy value is calculated for one of a plurality of consecutive subsections of bytes included in the file section, and the high frequency high-low probability ratio is calculated by dividing a high probability measure of a byte value by a low probability measure of a byte value included in the file section, and c2) comparing the calculated high frequency entropy value to a high frequency entropy threshold value and the calculated high frequency high-low probability ratio to a high frequency high-low probability threshold to determine if the received file is high frequency encrypted;

d) if the file section is low frequency encrypted and high frequency encrypted, setting an encryption status condition associated with the received file to indicate the received file is encrypted; and e) if the received file encryption status condition indicates the received file is encrypted, utilizing a watcher to monitor file events associated with the plurality of files received by the device associated with the file synchronization and sharing network to determine if one or more of the plurality of files are ransomware infected.

2. The processor implemented method for detecting a ransomware infection in a plurality of files according to claim 1, wherein the value-count includes a total number of byte value occurrences in the file section for each possible byte value, and a)-d) are repeated for each of the plurality of files received by the device associated with the file synchronization and sharing network.

3. The processor implemented method for detecting a ransomware infection in a plurality of files according to claim 1, further comprising:

setting the encryption status condition as true if one or both of a) the calculated low frequency entropy value is greater than or equal to the low frequency entropy threshold value indicating low frequency encryption of the received file, and b) the calculated low frequency average value of all byte values is outside the low frequency average value range threshold indicating low frequency encryption of the received file, and c) the calculated high frequency entropy value is greater than or equal to the high frequency entropy threshold value indicating high frequency encryption of the received file and d) the calculated high frequency high-low probability ratio value is less than or equal to the high frequency high-low probability threshold value indicating high frequency encryption of the received file.

4. The processor implemented method for detecting a ransomware infection in a plurality of files according to claim 1, wherein the low frequency analysis of the file section b1) calculates the low frequency entropy value associated with the file section and calculates the low frequency average value of all byte values associated with the file section, and b2) compares the calculated low frequency entropy value to the low frequency entropy threshold value and compares the calculated low frequency average value of all byte values to the low frequency average value range threshold to determine if the received file is low frequency encrypted.

5. The processor implemented method for detecting a ransomware infection in a plurality of files according to claim 1, wherein the high frequency analysis of the file section c1a) calculates a high frequency entropy value for each of one or more of the plurality of subsections of bytes, c1b) calculates a high frequency average entropy value of the one or more plurality of subsection bytes, and c1c) determines a low calculated high frequency entropy value of the one or more plurality of subsection bytes, and c2a) compares the calculated high frequency average entropy value of the one or more plurality of subsection bytes to a high frequency entropy average threshold, c2b) compares the low calculated high frequency entropy value of the one or more plurality of subsection bytes to a high frequency entropy minimum threshold and c2c) compares the calculated high frequency high-low probability ratio value to a high frequency high-low probability threshold value to determine if the received file is high frequency encrypted.

6. The processor implemented method for detecting a ransomware infection in a plurality of files according to claim 1, wherein the low frequency analysis of the file section b1) calculates the low frequency entropy value associated with the file section and calculates the low frequency average value of all byte values associated with the file section, and b2) compares the calculated low frequency entropy value to the low frequency entropy threshold value and compares the calculated low frequency average value of all byte values to the low frequency average value range threshold to determine if the received file is low frequency encrypted, and wherein the high frequency analysis of the file section c1a) calculates a high frequency entropy value for each of one or more of the plurality of subsections of bytes, c1b) calculates a high frequency average entropy value of the one or more plurality of subsection bytes, and c1c) determines a low calculated high frequency entropy value of the one or more plurality of subsection bytes, and c2a) compares the calculated high frequency average entropy value of the one or more plurality of subsection bytes to a high frequency entropy average threshold, c2b) compares the low calculated high frequency entropy value of the one or more plurality of subsection bytes to a high frequency entropy minimum threshold and c2c) compares the calculated high frequency high-low probability ratio value to a high frequency high-low probability threshold value to determine if the received file is high frequency encrypted.

7. The processor implemented method for detecting a ransomware infection in a plurality of files according to claim 6, wherein the low frequency entropy threshold value is 7.92, the low frequency average value range threshold is 125-130, the plurality of subsections of bytes includes 256 bytes, the high frequency entropy average threshold is 7.1, the high frequency entropy minimum threshold is 6.25, and the high frequency high-low probability threshold value is 5.

8. The processor implemented method for detecting a ransomware infection in a plurality of files according to claim 1, wherein the file events monitored by the watcher include one or more of a total number of received encrypted files, percentage of received encrypted files relative to received unencrypted files, average time between received files, creation time of the received encrypted files, time stamps of the received files; file extensions of the received encrypted files; total number of deleted encrypted files; total number of deleted unencrypted files; and file folders associated with deleted files.

9. The processor implemented method for detecting a ransomware infection in a plurality of files according to claim 8, further comprising:

triggering a ransomware alert if any one or more of the following conditions are true:

the percentage of received encrypted files relative to received unencrypted files is greater than 75%;

the average time between received files is less than 10 seconds;

the creation time of the received encrypted files is recent;

the time stamps of the received files are not equivalent;

more than 50% of the file extensions of the received encrypted files are the same;

more than 50% of the encrypted received files include an unknown file extension;

the total number of deleted files is greater than 75% of the total number of encrypted files;

more than 50% of the deleted files are not encrypted;
more than 50% of the deleted files have known file extensions; and
more than 50% of the deleted files are in the same file folders as new encrypted files received.

10. The processor implemented method for detecting a ransomware infection in a plurality of files according to claim 9, further comprising:
disabling the device operatively associated with the file synchronization and sharing network if a ransomware alert is triggered.

11. The processor implemented method for detecting a ransomware infection in a plurality of files according to claim 1, wherein the watcher monitors the plurality of file events associated with the plurality of files received by the device, generates a ransomware evaluation output value based on the monitored plurality of file events and compares the ransomware evaluation output value to a ransomware alert threshold value to determine if one or more of the plurality of files are ransomware infected.

12. The processor implemented method for detecting a ransomware infection in a plurality of files according to claim 11, wherein the watcher monitors the plurality of file events and associated file event times associated with the plurality of files received by the device, and generates a ransomware evaluation output value based on the monitored plurality of file events and associated file event times.

13. The processor implemented method for detecting a ransomware infection in a plurality of files according to claim 11, wherein each of the monitored plurality of file events is associated with one of a plurality of weighting values, and the ransomware evaluation output value is based on the monitored plurality of file events and their respective weighting value.

14. The processor implemented method for detecting a ransomware infection in a plurality of files according to claim 13, wherein the watcher includes a plurality of counters associated with the monitored plurality of file events and the watcher sets a file event condition as true if a counter associated with the file event exceeds a counter threshold value associated with the file event, each of the file event conditions is associated with one of the plurality of weighting values, and the ransomware evaluation output value is generated based on the file event conditions and associated plurality of weighting values.

15. The processor implemented method for detecting a ransomware infection in a plurality of files according to claim 1, further comprising:
if the watcher determines one or more of the plurality of files are ransomware infected, generating a ransomware alert signature associated with the plurality of files; and
triggering a ransomware alert if the ransomware alert signature is not associated with a nonthreat ransomware alert signature.

16. The processor implemented method for detecting a ransomware infection in a plurality of files according to claim 1,
wherein the watcher monitors the plurality of file events associated with the plurality of files received by the device, generates a ransomware evaluation output value based on the monitored plurality of file events and compares the ransomware evaluation output value to a ransomware alert threshold value to determine if one or more of the plurality of files are ransomware infected;
wherein the watcher includes a plurality of counters associated with the monitored plurality of file events and the watcher sets a file event condition as true if a counter associated with the file event exceeds a counter threshold value associated with the file event, each of the file event conditions is associated with one of the plurality of weighting values, and the ransomware evaluation output value is generated based on the file event conditions and associated plurality of weighting values;
if the watcher determines one or more of the plurality of files are ransomware infected, generating a ransomware alert signature associated with the plurality of files based on the plurality of counters; and
triggering a ransomware alert if the ransomware alert signature is not associated with a nonthreat ransomware alert signature.

17. The processor implemented method for detecting a ransomware infection in a plurality of files according to claim 16, wherein the ransomware alert signature is associated with a bit-pattern representation of the plurality of counters and a file extension associated with most of the encrypted files.

18. The processor implemented method for detecting a ransomware infection in a plurality of files according to claim 1, wherein one or both of the low frequency analysis and high frequency analysis includes one or more of:
Shannon entropy values;
Chi-Squared test;
mean byte values; and
a Monte Carlo method to approximate pi to indicate randomness of the byte values.

19. The processor implemented method for detecting a ransomware infection in a plurality of files according to claim 1, wherein one or more of the low frequency threshold value, the low frequency average value range threshold, the high frequency entropy threshold value and the high frequency high-low probability threshold value are dependent on a size of the file section.

20. The processor implemented method for detecting a ransomware infection in a plurality of files according to claim 1, wherein a)-d) are performed by a local agent module operatively associated with the device and e) is performed by one of a local network server and remote cloud based server operatively associated with the device.

21. A file synchronization and sharing computer network for synchronizing and sharing files and detecting a ransomware infection in a plurality of files received by a device operatively associated with the network, each file including a plurality of sequential bytes of digital information and the file synchronization and sharing computer network comprising:
a network of a plurality of computer devices operatively associated with a common server network including one or more servers configured to synchronize and share files between the plurality of computer devices;
one or more agent modules operatively associated with the network of plurality of computer devices and the common server network,
the one or more agent modules and the one or more servers configured to:
a) determine a value-count of byte values included in a file section associated with a received file, the value-count including a count of byte value occurrences of the byte values included in the file section;
b) perform a low frequency analysis of the file section to determine if the file section is low frequency encrypted, the low frequency analysis including b1) calculating one or both of a low frequency entropy value associated with the file section and a low frequency average value of all byte values associated with the file section, the low frequency entropy value associated with the count of byte value occurrences of the byte values included in the file section, and b2) comparing one or both of the calculated low frequency entropy value to a low frequency entropy threshold value and the calculated low frequency average value of all byte values to a low frequency average value range threshold to determine if the received file is low frequency encrypted;

c) perform a high frequency analysis of the file section to determine if the file section is high frequency encrypted, the high frequency analysis including c1) calculating a high frequency entropy value associated with the file section and a high frequency high-low probability ratio value associated with the file section, the high frequency entropy value associated with a plurality of subsection entropy values where each subsection entropy value is calculated for one of a plurality of consecutive subsections of bytes included in the file section, and the high frequency high-low probability ratio is calculated by dividing a high probability measure of a byte value by a low probability measure of a byte value included in the file section, and c2) comparing the calculated high frequency entropy value to a high frequency entropy threshold value and the calculated high frequency high-low probability ratio to a high frequency high-low probability threshold to determine if the received file is high frequency encrypted;

d) if the file section is low frequency encrypted and high frequency encrypted, set an encryption status condition associated with the received file to indicate the received file is encrypted; and e) if the received file encryption status condition indicates the received file is encrypted, utilize a watcher to monitor file events associated with the plurality of files received by the device associated with the file synchronization and sharing network to determine if one or more of the plurality of files are ransomware infected.

22. The file synchronization and sharing computer network for synchronizing and sharing files and detecting a ransomware infection in a plurality of files received by a device according to claim 21, the one or more agent modules and the one or more servers further configured to:
set the encryption status condition as true if one or both of a) the calculated low frequency entropy value is greater than or equal to the low frequency entropy threshold value indicating low frequency encryption of the received file, and b) the calculated low frequency average value of all byte values is outside the low frequency average value range threshold indicating low frequency encryption of the received file, and c) the calculated high frequency entropy value is greater than or equal to the high frequency entropy threshold value indicating high frequency encryption of the received file and d) the calculated high frequency high-low probability ratio value is less than or equal to the high frequency high-low probability threshold value indicating high frequency encryption of the received file.

23. The file synchronization and sharing computer network for synchronizing and sharing files and detecting a ransomware infection in a plurality of files received by a device according to claim 21, wherein the low frequency analysis of the file section b1) calculates the low frequency entropy value associated with the file section and calculates the low frequency average value of all byte values associated with the file section, and b2) compares the calculated low frequency entropy value to the low frequency entropy threshold value and compares the calculated low frequency average value of all byte values to the low frequency average value range threshold to determine if the received file is low frequency encrypted.

24. The file synchronization and sharing computer network for synchronizing and sharing files and detecting a ransomware infection in a plurality of files received by a device according to claim 21, wherein the high frequency analysis of the file section c1a) calculates a high frequency entropy value for each of one or more of the plurality of subsections of bytes, c1b) calculates a high frequency average entropy value of the one or more plurality of subsection bytes, and c1 c) determines a low calculated high frequency entropy value of the one or more plurality of subsection bytes, and c2a) compares the calculated high frequency average entropy value of the one or more plurality of subsection bytes to a high frequency entropy average threshold, c2b) compares the low calculated high frequency entropy value of the one or more plurality of subsection bytes to a high frequency entropy minimum threshold and c2c) compares the calculated high frequency high-low probability ratio value to a high frequency high-low probability threshold value to determine if the received file is high frequency encrypted.

25. The file synchronization and sharing computer network for synchronizing and sharing files and detecting a ransomware infection in a plurality of files received by a device according to claim 21, wherein the file events monitored by the watcher include one or more of a total number of received encrypted files, percentage of received encrypted files relative to received unencrypted files, average time between received files, creation time of the received encrypted files, time stamps of the received files; file extensions of the received encrypted files; total number of deleted encrypted files; total number of deleted unencrypted files; and file folders associated with deleted files.

26. A processor implemented method for detecting a ransomware infection in a plurality of files received by a device operatively associated with a file synchronization and sharing network, each file including a plurality of sequential bytes of digital information, the method comprising:

a) determining a value-count of byte values included in a file section associated with a received file, the value-count including a count of byte value occurrences of the byte values included in the file section;

b) performing a low frequency analysis of the file section to determine if the file section is low frequency encrypted, the low frequency analysis including b1) calculating one or both of a low frequency entropy value associated with the file section and a low frequency average value of all byte values associated with the file section, the low frequency entropy value associated with the count of byte value occurrences of the byte values included in the file section, and b2) comparing one or both of the calculated low frequency entropy value to a low frequency entropy threshold value and the calculated low frequency average value of all byte values to a low frequency average value range threshold to determine if the received file is low frequency encrypted;

c) performing a high frequency analysis of the file section to determine if the file section is high frequency encrypted, the high frequency analysis including c1) calculating a high frequency entropy value associated with the file section and a high frequency high-low probability ratio value associated with the file section, the high frequency entropy value associated with a plurality of subsection entropy values where each subsection entropy value is calculated for one of a plurality of consecutive subsections of bytes included in the file section, and the high frequency high-low probability ratio is calculated by dividing a high probability measure of a byte value by a low probability measure of a byte value included in the file section, and c2) comparing the calculated high frequency entropy value to a high frequency entropy threshold value and the calculated high frequency high-low probability ratio to a high frequency high-low probability threshold to determine if the received file is high frequency encrypted;

d) if the file section is low frequency encrypted and high frequency encrypted, setting an encryption status condition associated with the received file to indicate the received file is encrypted; and e) if the received file encryption status condition indicates the received file is encrypted, utilizing a watcher to monitor a plurality of file events associated with the plurality of files received by the device associated with the file synchronization and sharing network to determine if one or more of the plurality of files are ransomware infected, wherein the watcher includes a plurality of counters associated with the monitored plurality of file events and the watcher sets a file event condition as true if a counter associated with the file event exceeds a counter threshold value associated with the file event, each of the file event conditions is associated with one of a plurality of weighting values, and a ransomware evaluation output value is generated based on the file event conditions and associated plurality of weighting values.

27. The processor implemented method for detecting a ransomware infection in a plurality of files according to claim 26, wherein the file events monitored by the watcher include one or more of a total number of received encrypted files, percentage of received encrypted files relative to received unencrypted files, average time between received files, creation time of the received encrypted files, time stamps of the received files; file extensions of the received encrypted files; total number of deleted encrypted files; total number of deleted unencrypted files; and file folders associated with deleted files.

* * * * *